（12） United States Patent
Kanistras et al.

(10) Patent No.: US 10,730,607 B2
(45) Date of Patent: Aug. 4, 2020

(54) CIRCULATION CONTROL SYSTEM FOR AERIAL VEHICLES

(71) Applicant: Colorado Seminary Which Owns and Operates the University of Denver, Denver, CO (US)

(72) Inventors: Konstantinos Kanistras, Englewood, CO (US); Pranith Chander Saka, Denver, CO (US); Matthew J. Rutherford, Denver, CO (US); Kimon P. Valavanis, Denver, CO (US)

(73) Assignee: Colorado Seminary Which Owns and Operates the University of Denver, Denver, CO (US)

( * ) Notice: Subject to any disclaimer, the term of this patent is extended or adjusted under 35 U.S.C. 154(b) by 224 days.

(21) Appl. No.: 15/814,216

(22) Filed: Nov. 15, 2017

(65) Prior Publication Data

US 2018/0134372 A1 May 17, 2018

Related U.S. Application Data

(60) Provisional application No. 62/422,517, filed on Nov. 15, 2016.

(51) Int. Cl.
*B64C 9/38* (2006.01)
*B64C 39/02* (2006.01)
(Continued)

(52) U.S. Cl.
CPC .............. *B64C 9/38* (2013.01); *B64C 21/04* (2013.01); *B64C 39/024* (2013.01); *B64C 39/04* (2013.01);
(Continued)

(58) Field of Classification Search
CPC ............... B64C 21/04; B64C 2230/04; B64C 2201/086; B64C 2201/104; B64C 39/024;
(Continued)

(56) References Cited

U.S. PATENT DOCUMENTS

2005/0029396 A1* 2/2005 Englar ................... B64C 3/141
244/12.6
2007/0069066 A1* 3/2007 Lawson .................... B64C 9/18
244/12.1
(Continued)

OTHER PUBLICATIONS

Saka, et al., "Development of a Framework for a Circulation", "Areospace Conference", Mar. 5, 2016, p. 9, Publisher: IEEE.
(Continued)

*Primary Examiner* — Claude J Brown
(74) *Attorney, Agent, or Firm* — Neugeboren O'Dowd PC

(57) ABSTRACT

A circulation control system for an aerial vehicle. The system comprises an air supply unit attached to the aerial vehicle configured to generate a specified amount of mass air flow; an air delivery system, the air supply unit and the air delivery system being connected via at least one tube that turns at least one right angle; a circulation control wing through which air from the air supply unit is delivered through the air delivery system, the circulation control wing comprising at least one plenum configured to blow the air out of a slot in a trailing edge of the wing, and at least one dual radius flap positioned behind the slot.

20 Claims, 18 Drawing Sheets

(51) Int. Cl.
*B64C 21/04* (2006.01)
*F04D 17/10* (2006.01)
*B64C 39/04* (2006.01)

(52) U.S. Cl.
CPC .. *B64C 2201/021* (2013.01); *B64C 2201/086* (2013.01); *B64C 2201/104* (2013.01); *B64C 2230/04* (2013.01); *F04D 17/10* (2013.01); *Y02T 50/166* (2013.01); *Y02T 50/32* (2013.01)

(58) Field of Classification Search
CPC ..... B64C 39/04; B64C 9/38; B64C 2201/021; F04D 17/10; Y02T 50/32
USPC ......................................................... 244/207
See application file for complete search history.

(56) References Cited

U.S. PATENT DOCUMENTS

| | | | | |
|---|---|---|---|---|
| 2009/0108141 A1* | 4/2009 | Shmilovich | ............... | B64C 3/58 244/207 |
| 2013/0306788 A1* | 11/2013 | Criado | .................. | B64C 23/005 244/36 |
| 2014/0103158 A1* | 4/2014 | Berry | .................. | B64C 29/0025 244/2 |
| 2015/0232180 A1* | 8/2015 | Nam | ....................... | B64C 37/00 244/2 |

OTHER PUBLICATIONS

Gallagher, et al., "Fixed Wing Performance", "Flight Test Manual", Sep. 30, 1992, p. 845 Publisher: US Navy.
Kanistras, et al., "Low Speed Wind Tunnel Investigation of a Circulation Control Wing for Enhanced Lift", "American Institute of Aeronautics and Astronautics", 2015, p. 17.

* cited by examiner

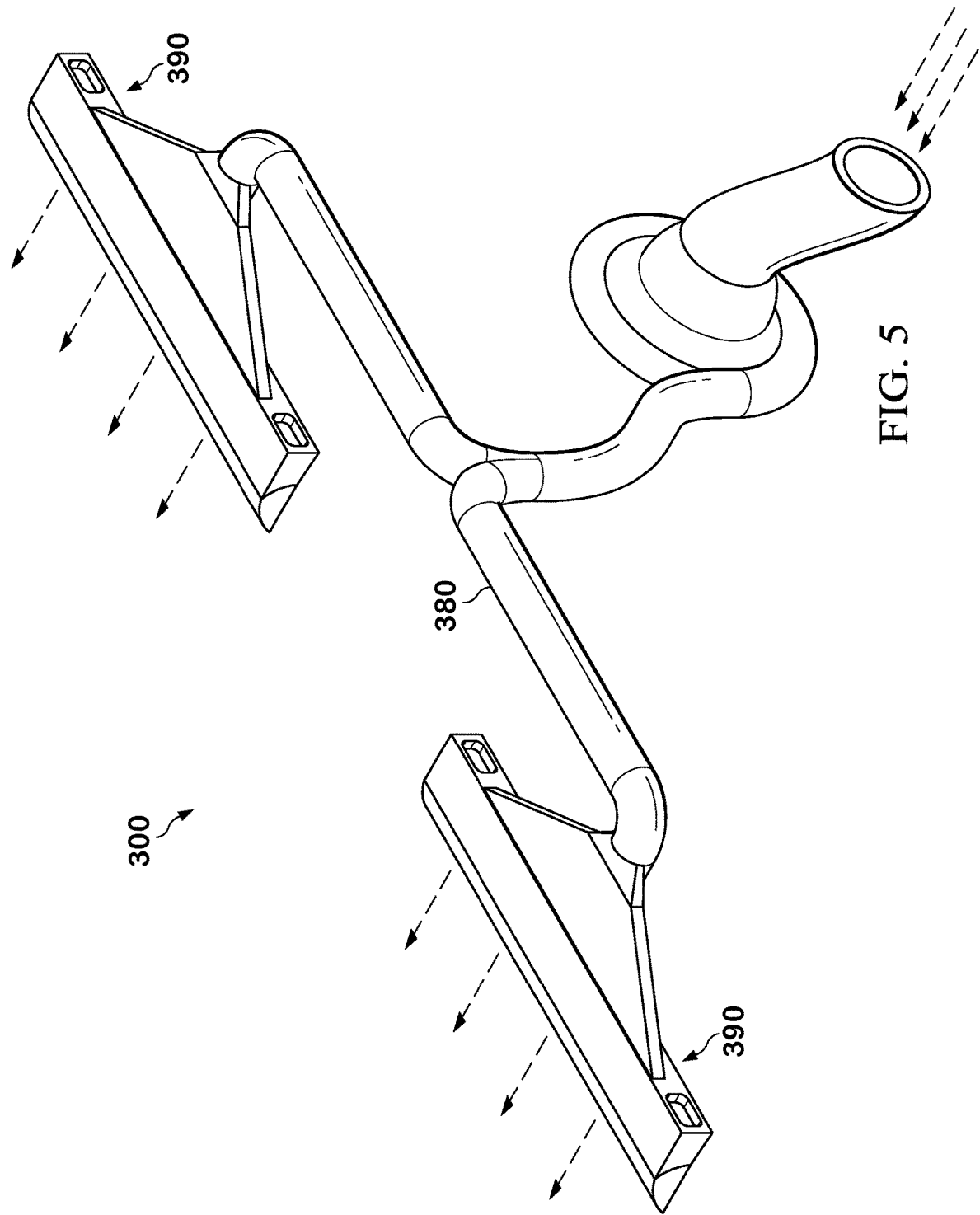

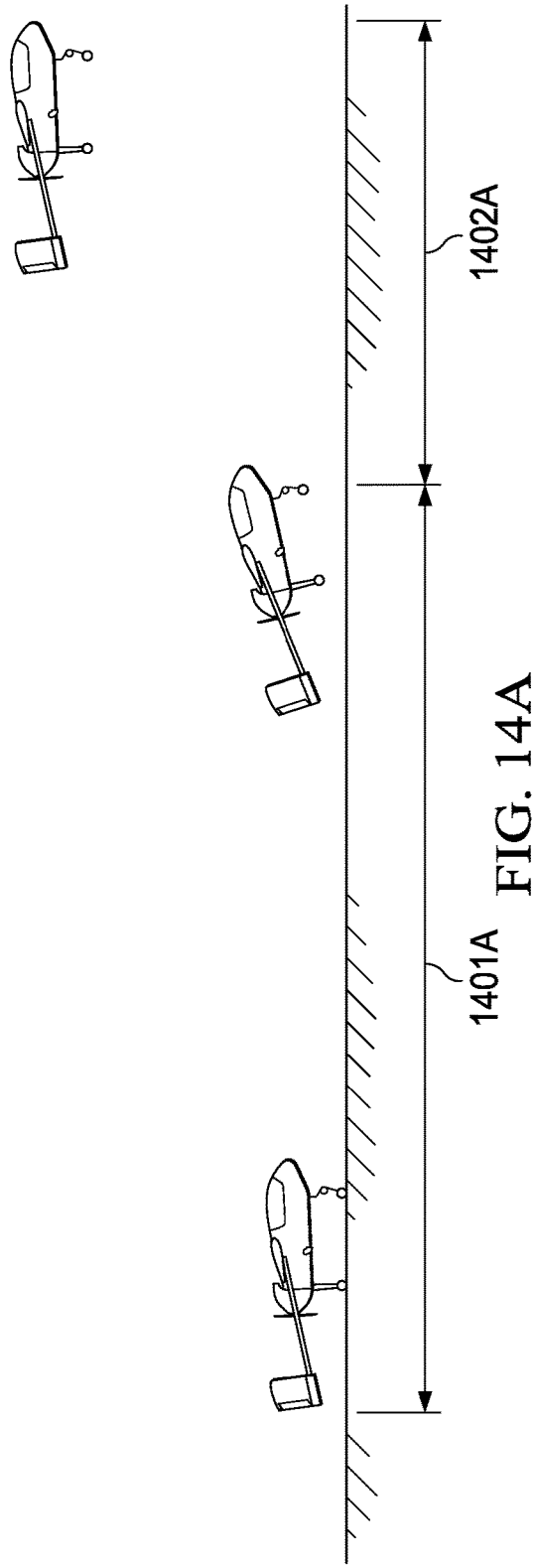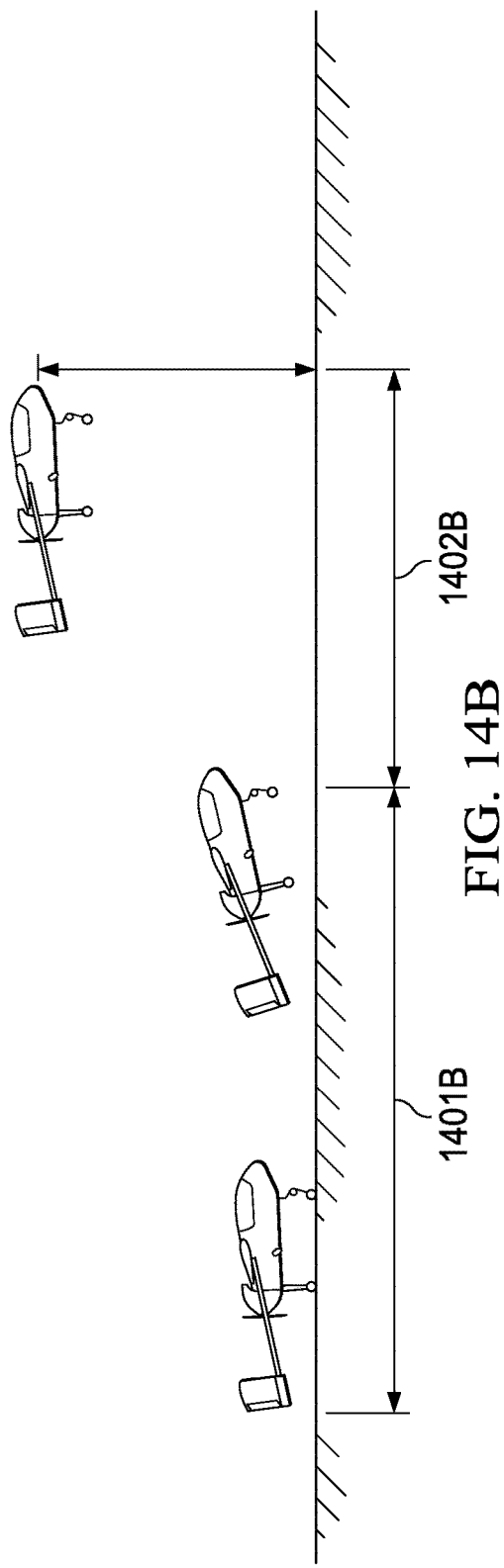

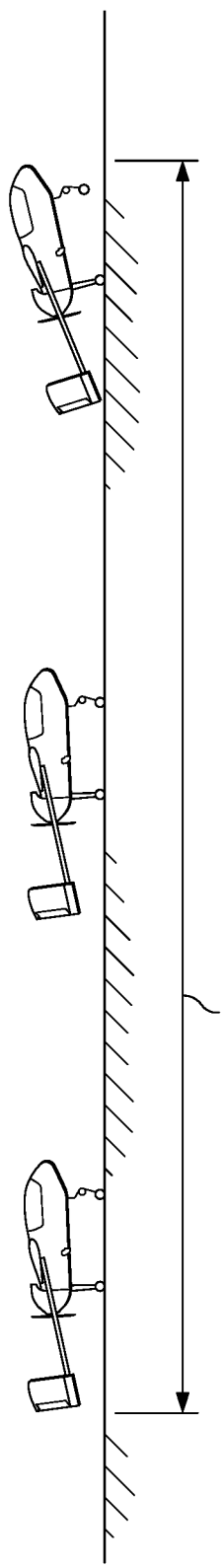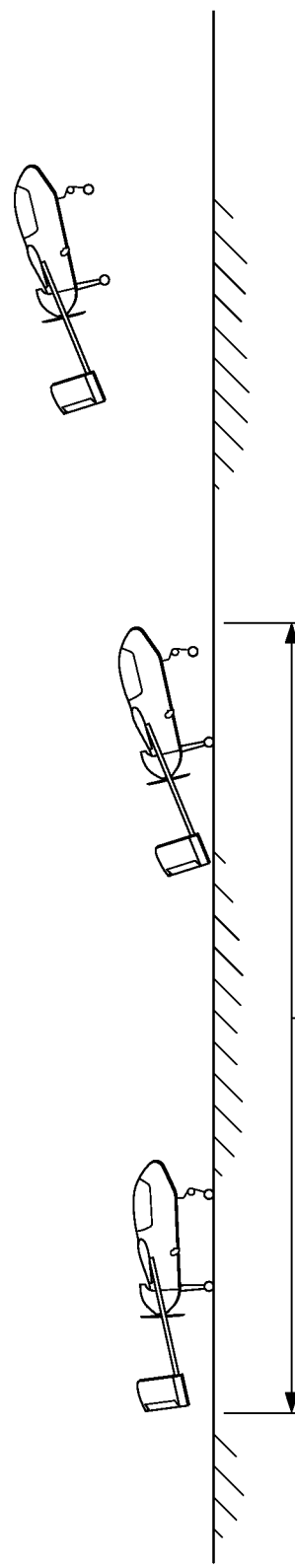

CIRCULATION CONTROL SYSTEM FOR AERIAL VEHICLES

PRIORITY

This application claims priority to U.S. Provisional Application No. 62/422,517, filed Nov. 15, 2016 entitled CIRCULATION CONTROL SYSTEM FOR AERIAL VEHICLES, the disclosure of which is incorporated herein by reference in its entirety.

FIELD

The present disclosure relates generally to circulation control systems for improving performance of unmanned aerial vehicles. Specifically, but without limitation, the disclosure relates to implementing circulation control systems on unmanned aerial vehicles in order to reduce required takeoff distance and increase payload.

BACKGROUND

Circulation control, as it pertains to aerodynamics, refers to systems and methods that attempt to utilize the Coanda effect (the tendency of a fluid jet to stay attached to a convex surface) to increase lift. Such systems have been researched for improving performance characteristics of flying vehicles—particularly commercial airplanes—with limited success.

Unmanned aerial vehicles (UAV) have recently proliferated and are being used for an ever-increasing number of applications. Performance improvements are constantly being sought, such as reducing the required runway distance for takeoff, reducing power consumption, increasing aerodynamic efficiency, and increasing the payload that the UAV can carry, among others. A need exists for new UAV designs that achieve these goals. Further, many existing, commercially-available UAVs could be improved through retrofitting with systems that achieve these goals.

SUMMARY

An aspect of the present disclosure provides a circulation control system for an aerial vehicle. The system may comprise an air supply unit attached to the aerial vehicle configured to generate a specified amount of mass air flow and an air delivery system, the air supply unit and the air delivery system being connected via at least one tube that turns at least one right angle. The system may further comprise a circulation control wing through which air from the air supply unit is delivered through the air delivery system. The circulation control wing may comprise at least one plenum configured to blow the air out of a slot in a trailing edge of the wing, and at least one dual radius flap positioned behind the slot.

Another aspect of the disclosure provides an unmanned aerial vehicle (UAV) comprising a fixed wing and a circulation control system. The circulation control system may comprise an air supply unit attached to the UAV configured to generate a specified amount of mass air flow. The system may further comprise an air delivery system, the air supply unit and the air delivery system being connected via at least one tube that turns at least one right angle. The system may further comprise at least one plenum mounted within the fixed wing and configured to receive air from the air delivery system and blow the air out of a slot in a trailing edge of the wing, and at least one dual radius flap positioned behind the slot.

Another aspect of the disclosure provides a circulation control system for an aerial vehicle. The system may comprise an air supply unit defining a circulation control efficiency by providing a mass flow sufficient to increase lift for an airfoil of the aerial vehicle during takeoff and flight. The system may also comprise a circulation control wing comprising an air delivery system configured to deliver the mass flow to a trailing edge of the airfoil, a plenum, and a dual radius flap.

BRIEF DESCRIPTION OF THE DRAWINGS

FIG. 5 shows an alternative front perspective view of a circulation control system of the present disclosure in isolation.

FIG. 14A shows a trajectory of expected takeoff distance, takeoff angle, and lift of a conventional UAV.

FIG. 14B shows a trajectory of expected takeoff distance, takeoff angle, and lift of a UAV with a circulation control system of the present disclosure.

FIG. 15A shows the experimental takeoff distance of a UAV with circulation control off.

FIG. 15B shows the experimental takeoff distance of a UAV with circulation control on.

DETAILED DESCRIPTION

Figure 1:
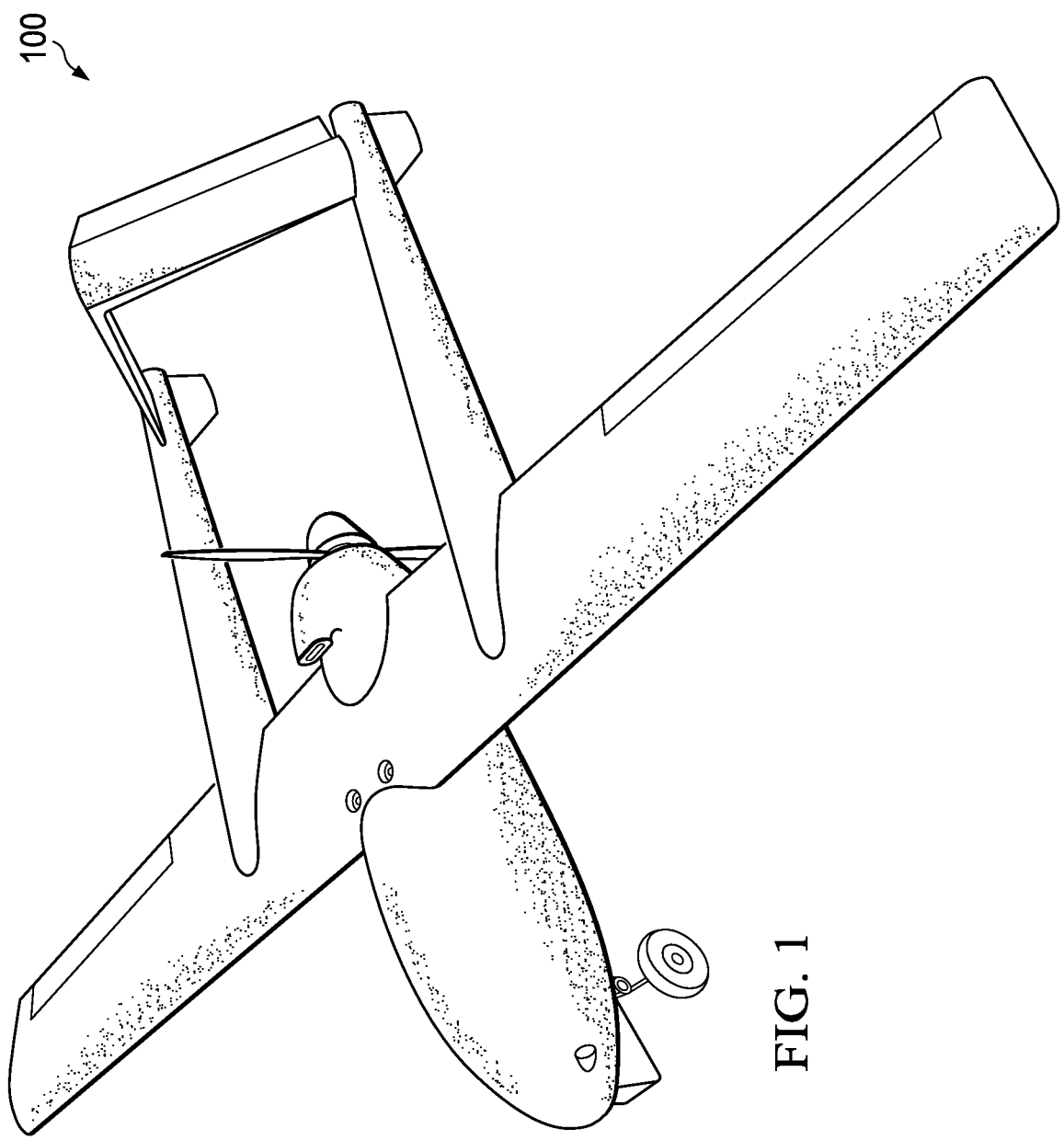
FIG. 1 shows a commercially-available fixed-wing small UAV.

The present disclosure provides a fixed-wing Unmanned Circulation Control Aerial Vehicle (UCCAV) capable of achieving Circulation Control-based flight, demonstrating short takeoff and landing characteristics and enhanced payload capabilities in comparison to UAVs without circulation control. Embodiments of the disclosure may be implemented in both a "circulation control system," ("CC system") which refers to a system that may be integrated (e.g., retrofitted) into any existing UAV platform or wing design that enhances lift through trailing-edge blowing of high-energy air; and a "circulation control wing," ("CC wing") which refers to an entire assembly of an airfoil or a combination of airfoils with conventional ailerons and built-in circulation-control-enhanced flaps. Both embodiments implement principles of Coanda-driven circulation control, which is an efficient active air flow control approach that can be used on fixed-wing aircraft to achieve high levels of lift. When trying to apply circulation control to small-scale aircraft, several challenges must be overcome that do not exist with circulation control systems of larger aircraft. These challenges are related to the source of air that must be provided on-board, weight penalties due to the internal air delivery system, and penalties due to the air supply unit's power consumption.

These challenges are addressed in the present design of the circulation control system and/or wing of the present disclosure, which is capable of achieving high lift augmentation due to its utilization of the Coanda effect and low drag-penalties at cruise flight due to its aerodynamic design. In general, embodiments of the present disclosure comprise an air supply unit (ASU) that takes in air from the front side of a UAV, then actively pushes and directs the air, through a system of tubes and specially designed plena, to slots at the back of a UAV wing, at particular air flow rates and over particular dimensions of the wing. This augments the air flow that normally occurs around a wing during UAV takeoff and flight, and enhances performance in takeoff distance (i.e., a shorter takeoff distance), lift during flight, and landing distance It is contemplated that because the system of the present disclosure enhances lift overall, the system may allow for greater payloads on a UAV than would be possible without the system.

Embodiments of the present disclosure may be used with various different airfoil shapes that are currently found on existing UAVs, or that may be developed for use with future UAVs, but specific NACA (National Advisory Committee for Aeronautics) standard airfoils, such as NACA 0015, are discussed in examples herein. One component of the CC system of the present disclosure, as previously mentioned, is an air supply unit (ASU). In certain embodiments, the ASU comprises a centrifugal compressor that actively intakes air through one side of the ASU and pushes it out the other. This ASU may be powered by a battery or battery pack. In embodiments, three to four 11-16V Li-ion batteries are used to power the ASU, but other embodiments may use different batteries. The batteries or battery packs may be integrated or separate from batteries or battery packs used to power the UAV itself. The ASU is responsible for supplying air to the entire CC system and its design and performance defines the overall performance of the CC wing.

Another component of the CC system is an Air Delivery System (ADS), which is responsible for delivering and distributing air uniformly across a portion of the rear wingspan of the UAV. Ideally, air from the ASU may be delivered to the rear of a wing with minimal air losses during air transport across the ADS. Both the ASU and ADS, as well as other components of the circulation control system, will be described in greater detail throughout the disclosure. Additionally, this disclosure describes tests conducted to compare performance between UAVs with and without the CC system; namely, experiments comparing the NACA0015 conventional airfoil-shape wings (integrated on an Anaconda-model UAV fuselage from ReadyMade RC, LLC, a commercially-available UAV) with the UCCAV of the present disclosure, are presented herein.

To apply circulation control to a small-scale fixed-wing UAV, space limitations and weight restrictions must be considered. Often, a small UAV will have a maximum takeoff weight of around 20 kg, so circulation control systems to be implemented on such a small UAV must be low in weight. It is contemplated that a suitable circulation control system comprising the air supply unit, the air delivery system, and the circulation control wing of the present disclosure is ideally suited to UAVs having certain specifications. For example, since the air supply unit and part of the air delivery system are located inside the fuselage and close to the center of gravity of the aircraft, a UAV with sufficient fuselage space is desirable. High payload capability is also desirable as the circulation control system adds weight on-board the UAV that needs to be compensated for. In addition, wingspan, wing loading and the chord length must also be considered. The Anaconda RMRC UAV 100 shown in FIG. 1, which is an inverted V-tail twin-boom type aircraft, has a wingspan of 2 meters and sufficient fuselage space, and is an example of a UAV that may be used with embodiments of the present disclosure. However, other suitable types of UAVs may be used with the CC system or CC wing of the present disclosure, and the references to the Anaconda RMRC herein should not be construed as limiting.

Table 1 below details the specifications of the Anaconda RMRC. This particular aircraft also has an average wing chord of 238 mm with slats, aps and ailerons. It has a payload of about 1.5 kg and an average speed of 10 m/s. Because of the fuselage specifications, an ASU and ADS may be assembled within the dimensions of this particular UAV.

TABLE 1

| Anaconda RMRC geometric characteristics | | | |
|---|---|---|---|
| Fuselage | | | |
| Length | L | 0.8 | m |
| Max. Height | $H_{max}$ | 0.11 | m |
| Max. Width | $W_{max}$ | 0.16 | m |
| Propeller | | | |
| Diameter | D | 15 | in |
| Pitch | P | 4 | in |
| Number of Blades | | 2 | |

Figure 2A:
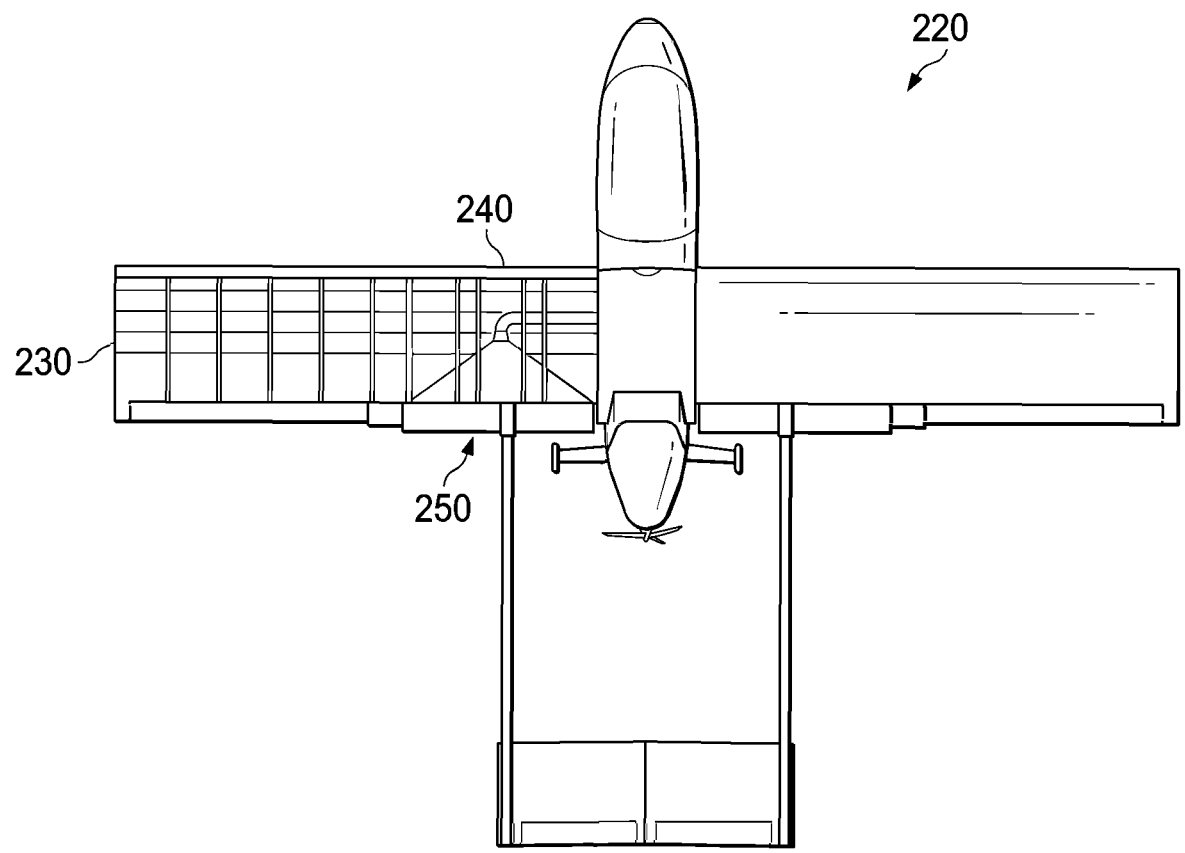
FIG. 2A shows a top plan view of the UAV of FIG. 1, further depicting components of the circulation control system of the present disclosure implemented on the UAV.
Figure 2B:
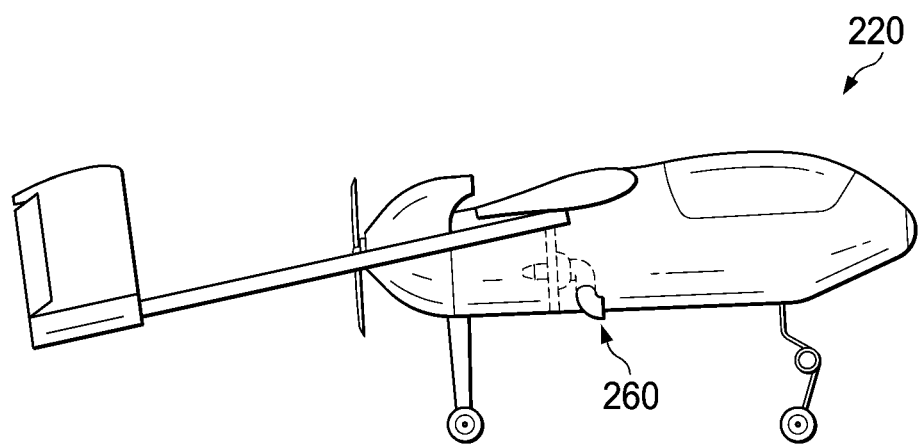
FIG. 2B shows a side view of the UAV of FIG. 1, further depicting components of the circulation control system of the present disclosure implemented on the UAV.

FIG. 2A shows a top plan view of an embodiment of the UCCAV 2204. A CC wing 230 is shown with a cutaway view on the left side of the wing 230. Additional components of the CC wing 230 include a plenum 240 and a dual radius flap 250, which will be described in more detail shortly. FIG. 2B shows a side view of the UCCAV 220, and shows the location of the air supply unit 260, which is mounted in the middle of the UCCAV 220 in the fuselage area.

Figure 3A:
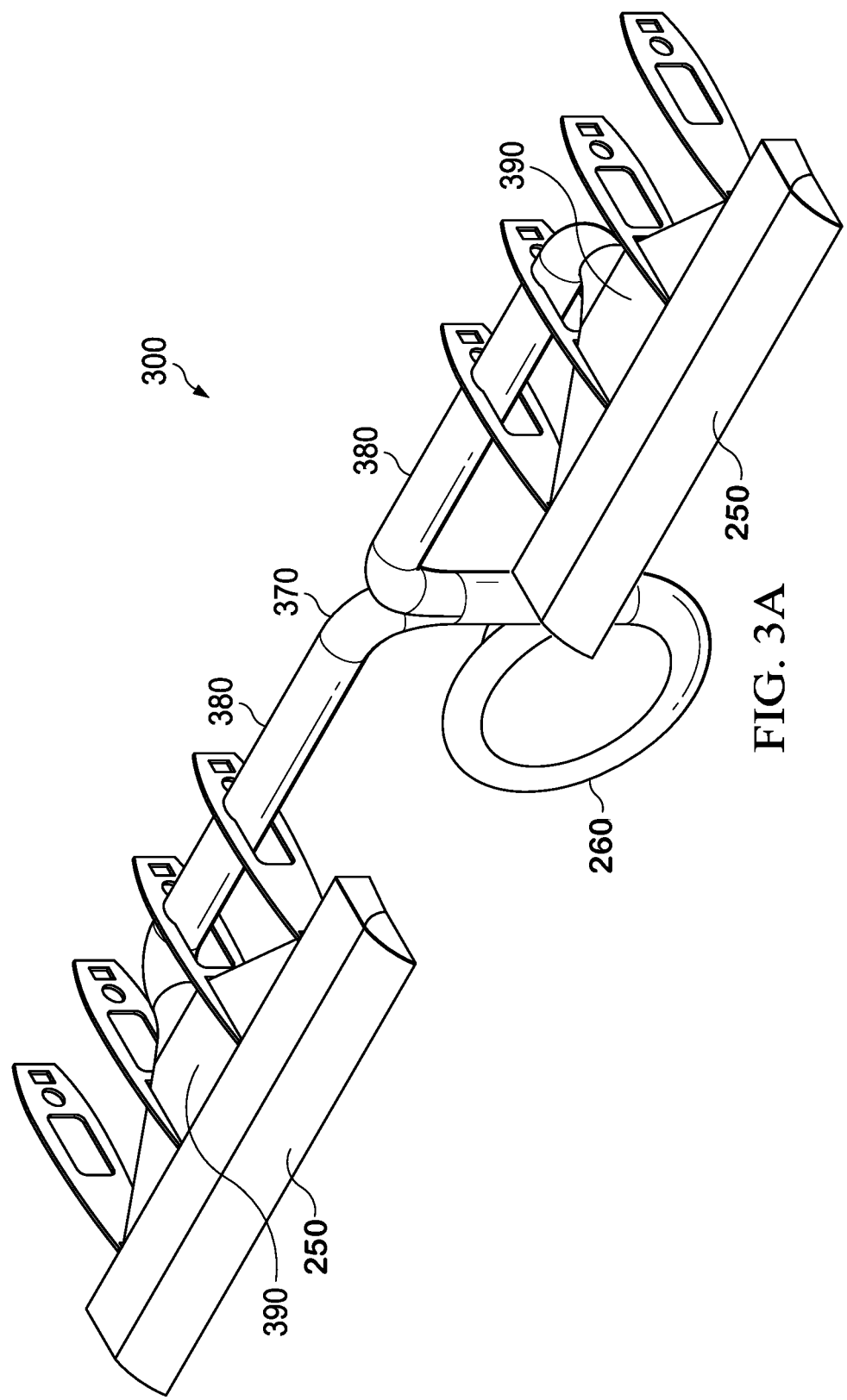
FIG. 3A shows a back perspective view of an assembled circulation control system of the present disclosure.

FIG. 3A shows the components of a CC system 300 of the present disclosure. The air supply unit 260 defines the circulation control efficiency by providing sufficient mass air flow that would be required to take advantage of the Coanda effect for the particular airfoil shape being used. An air delivery system 370 comprises tubes 380 and plena 390 that are responsible for delivering the mass flow (with minimum air losses) to one or more slots (not depicted) in a wing; and the circulation control wing itself (e.g., CC wing 230 of FIG. 2A), comprising the dual radius flaps 250 that are designed with particular geometry for efficient active flow blowing.

Figure 3B:
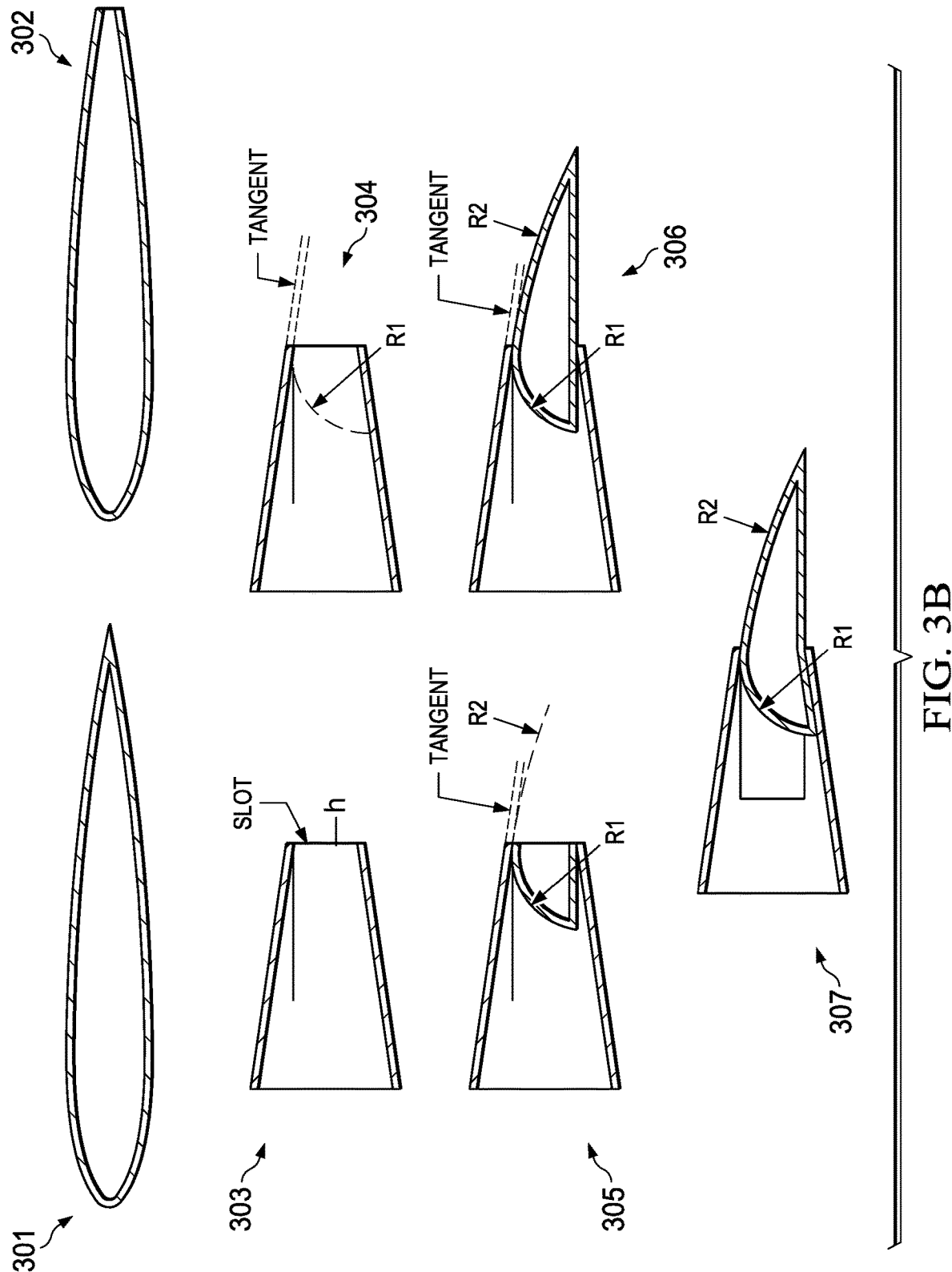
FIG. 3B shows cross-sectional views of steps for constructing a dual radius flap.

The "dual radius" aspect of the dual radius flaps 250 designed for the CC system of the present disclosure refers to a first and second Coanda radius. The flaps work as conventional rear wing flaps and are mechanically controlled, and in embodiments of the CC system, the dual radius flaps may be used to replace the existing flaps on a UAV wing. Their dual radius design maximizes the lift effects of active flow blowing. FIG. 3B shows how a dual radius flap of the present disclosure may be constructed in relation to an airfoil. Step 1 301 shows a profile view of an airfoil. Step 2 302 shows how the trailing edge of the airfoil may be cut off to create a space for the slot and the dual radius flap. Step 3 303 show where the slot is created that allows air from the ADS and plenum to blow through. Step 4 304 shows the first relevant radius r1 and the tangent of the airfoil. Step 5 305 shows the second relevant radius r2. Step 6 306 shows a dual radius flap constructed according to the dimensions of r1 and r2, which will be described in more detail presently. Step 7 307 shows the dual radius flap arranged with a plenum and defining the slot through which air blows.

The design parameters that define the efficacy of CC include the slot height, the slot location, the 1st Coanda radius (r1) and the 2nd radius (r2) along with the flap design. Exemplary parameters of a dual flap radius of the present disclosure are shown in Table 3:

TABLE 3

Baseline CC dual radius flap design parameters.

| | |
|---|---|
| c | 240 |
| h/c | 0.0016 |
| $r_1/c$ | 0.0375 |
| $h/r_1$ | 0.0444 |

The Coanda radius r1 of the dual radius flap is a constraint of primary importance since it defines the slot location. The upper and lower surface of the airfoil shown in FIG. 3B are intersected by a line, which is constrained in dimension equal to the summation of the r1 and the slot height (h). The slot is placed on the intersection of the upper and lower surface of the airfoil. The upper intersection of the airfoil is, then, used to build a tangent to the upper surface at the slot. A projection parallel to the tangent line is also constrained in a way that it passes through the slot. The projection is set tangential to r1 at the slot exit as FIG. 3B (at step 4, 304) depicts. The projection is set to be tangential to the slot and the center of the radius r2 is constrained to lie on the normal to the projection. Next, a line from the lower surface parallel to the chord is designed and intersects with the secondary radius r2, closing the contour of the flap.

An embodiment of the air supply unit with the air delivery system and the circulation control wing design shown in FIG. 3A was tested in experiments which are fully described in K. Kanistras, P. C. Saka, K. P. Valavanis, N. I. Vitzilaios, and M. J. Rutherford, Low Speed Wind Tunnel Investigation of a Circulation Control Wing for Enhanced Lift, 33nd Applied Aerodynamics AIAA Aviation Conference, Dallas, 2015, and P. C. Saka, K. Kanistras, K. P. Valavanis, and M. J. Rutherford, Development of a Framework for a Circulation Control-Based Unmanned Aerial Vehicle, IEEE Aerospace Conference, Montana 7-14 Mar. 2016, both of which are incorporated by reference herein in their entireties. In these experiments, 2-D wind tunnel tests were conducted on a modified NACA 0015 circulation control wing. The testing results showed that by using a circulation control wing with the dual radius flap with upper slot trailing edge described in FIG. 3B, with air blowing at 0.03 kg/s, a maximum incremental lift coefficient ($\Delta Cl$) of 0.9 of the wing could be achieved. In this embodiment, the air supply unit provided a mass flow of 0.03 kg/s equally divided between the two plena. The 0.03 kg/s measurement reflects the amount of mass flow produced by the air supply unit due to the aerodynamic properties of the impeller, minus losses in the air delivery system. The total circulation control system in the experiments was lightweight, and weighed only 0.65 kg (1.4 lbs.). Keeping the overall weight for the CC system is important to ensure that any enhancement in lift performance is not negated by the additional weight being added to the UAV.

Figure 4:
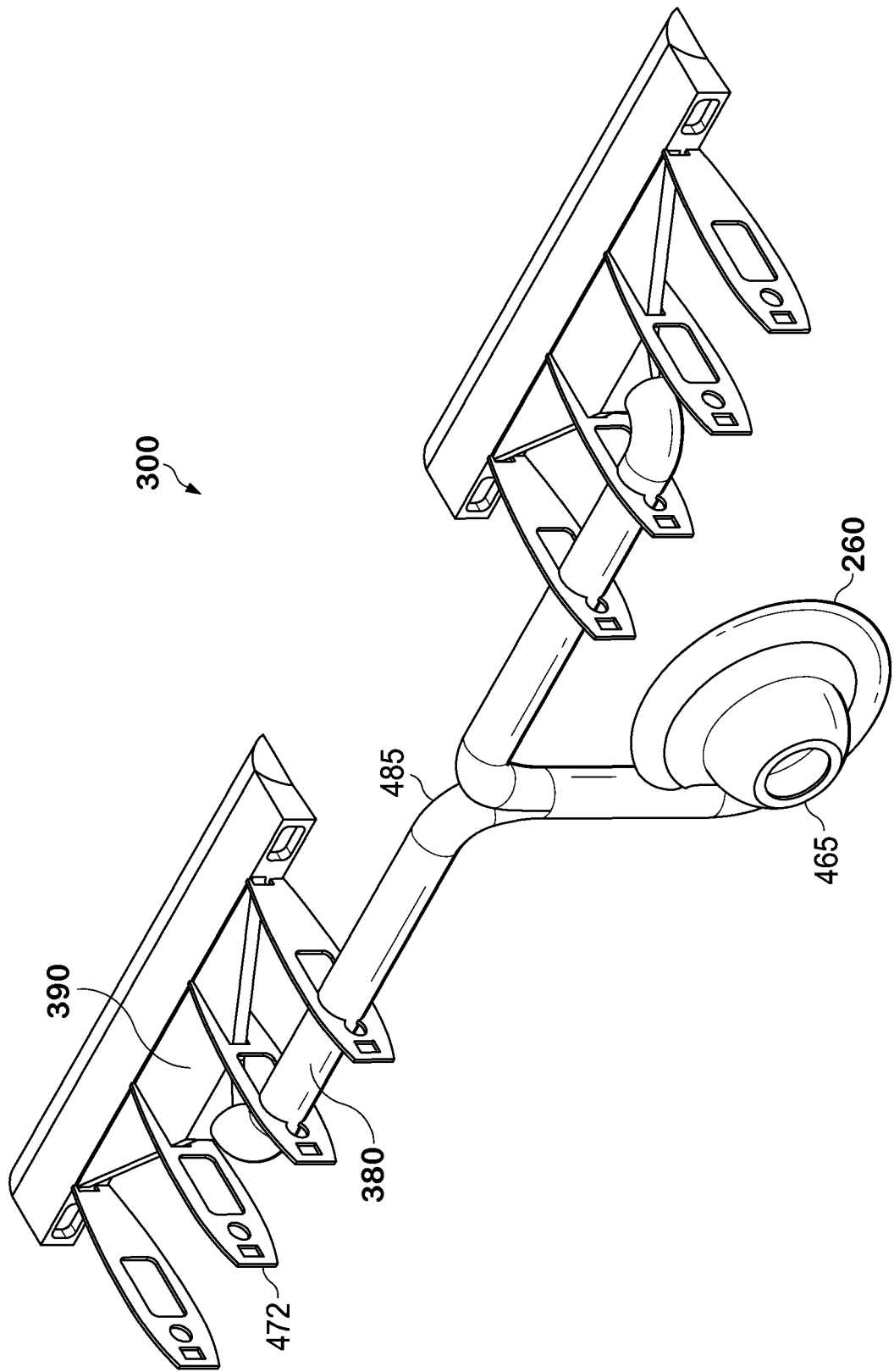
FIG. 4 shows a front perspective view of a circulation control system of the present disclosure depicted with ribs of a wing.

FIG. 4 shows the CC system of FIG. 3A from a front perspective view. This view shows the air intake portion 465 of the ASU 260, which faces the front of a UAV. The ADS, which, as previously described, comprises tubes 380 and plena 390, also comprises a junction 485 that diverts the air from the ASU 260 into the two tubes 380. As shown, the design of the junction 485 and tubes 380 turn the air flow at right angles twice in order to bring the air from the ASU 260 to the plena 390 and out the trailing edge of the wing. A major challenge to implementing circulation control on a small UAV is creating a design that ensures air flow to the trailing edge of the wing is sufficiently powerful, uniform across a given width of the wing, and consistently flowing. The challenge is due to the limited space for mass flow between components of the aircraft itself. In the present embodiments of the design, for example, the total distance between the intake 465 of the ASU 260 and the trailing edge of the wing could be well under 0.5 m. In order to get the air from the ASU 260 to the trailing edge, the ADS needs to turn the air through the tubes—in this design, at right angles. Fast moving air (at, for example, around 0.03 kg/s) being turned through these tubes can create significant turbulence within the tubes. In larger aircraft, circulation control may not require turns through a tube, or if they do, the lengths of tubes after a turn may allow the mass flow to smooth out. However, as shown in this design for a very small aircraft, the turns in the present design exist right outside the ASU 260 and right before the plena 390. This may create a lot of turbulence and loss of consistent mass flow from the ASU. Other aspects of the design mitigate the turbulence and losses. Namely, the size and power of the ASU, the design of the ASU (described with reference to FIGS. 7A and 7B), and the design of the plenum (described with reference to FIGS. 6A and 6B) allow for mass flow to be sufficiently powerful, uniform across a given width of the wing, and consistently flowing.

Additionally, this design allows this distribution of air to take place within the body of the UAV and the wing itself, without requiring any mechanical components to be mounted externally on a wing, which would cause aerodynamic inefficiencies due to drag. In this design, the only parts of the system that are externally exposed, altering the original aerodynamics of the UAV, are the air intake portion 465 and the dual radius flaps. The CC system 300 further comprises ribs 472, which provide structural support for the tubes 380 and plena 490 to hold them in place within a CC wing.

FIG. 5 shows an alternative front perspective view of the CC system 300, which is the same as FIGS. 3A and 4, but is shown without the ribs to better illustrate the design of the plena 390. As shown, each plenum 390 takes in air from the ADS tubes 380 and distributes it across a portion of the trailing edge of the wing. The plenum 390 blows air out of slots and against the dual radius flaps that point downward, which augments the lift on the wing, utilizing the Coanda effect, beyond the ordinary lift created by the existing airfoil shape.

Figure 6A:
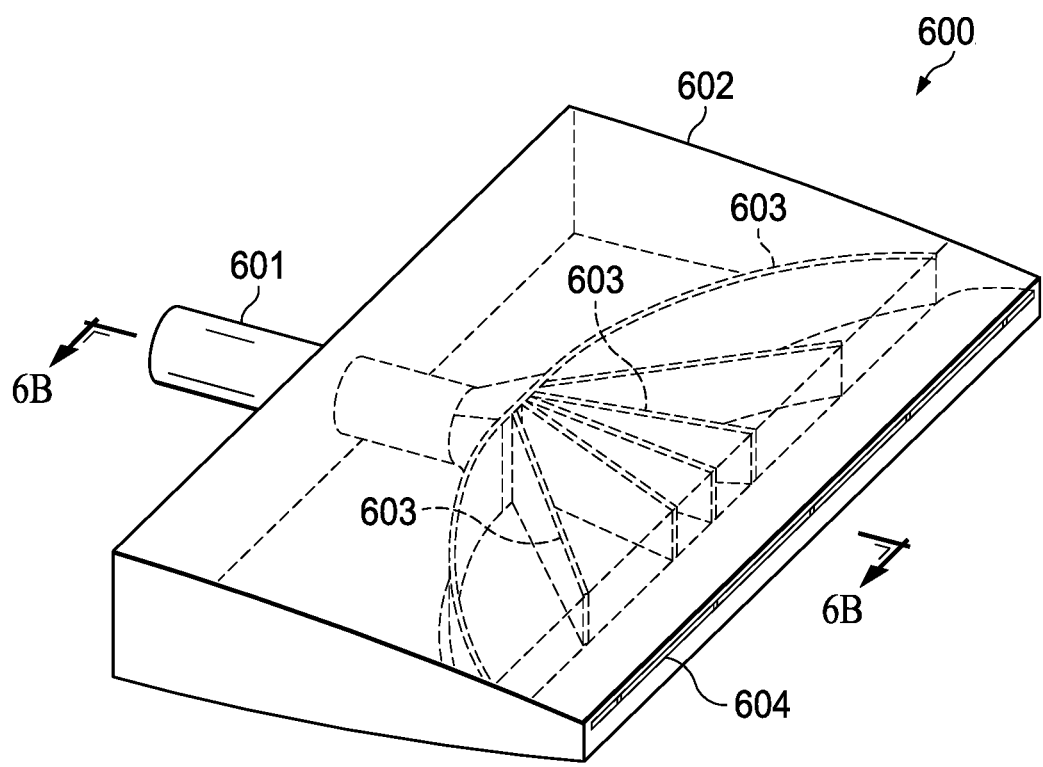
FIG. 6A shows a perspective view of a plenum portion of the circulation control system.
Figure 6B:
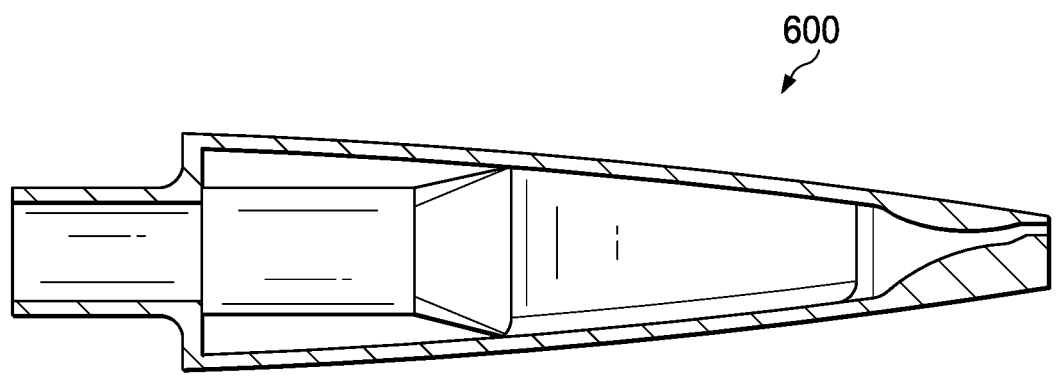
FIG. 6B shows a side view of a plenum portion of the circulation control system

FIG. 6A shows a perspective transparent view of a plenum 600 of the present disclosure. The plenum 600 comprises an inlet tube 601, and outer casing 602 and a plurality of internal air guides 603 that distribute the air equally across the width of the air outlet slot 604. The shape of the internal air guides 603 are specifically designed to mitigate the turbulence of the mass flow from the turns in the ADS and reduce mass flow losses. The internal air guides 603 are not necessarily evenly spaced. Depending on the embodiments and the requirements of the particular airfoil, the internal air guides 603 may be shaped differently to evenly distribute the air flow across the plenum. In many embodiments, the plenum design and internal air slots may be designed to compensate for mass flow being stronger at the outer side of the inlet tube 601, which may occur because of the right angle turn that the air goes through right before it reaches the plenum 600. The air outlet slot 604 may correspond to a width of a dual radius flap; therefore, the internal air 603 guides may effectively distribute air equally along the width of the dual radius flap. The particular plenum design shown may be used with, for example, a NACA 0015 airfoil shape CC wing, which has zero leading and trailing edge sweep and no winglets. The NACA 0015 airfoil, which is a symmetrical airfoil with a 15% thickness, is a well-studied airfoil with good CC wing characteristics for this design, which blows air through an upper slot in the wing. It gives the highest lift enhancement compared to other airfoils and high augmentation ratios with the 2:1 Coanda surface configuration. Therefore, it was used in the experiments described throughout this disclosure. The plenum design shown has a span of 150 mm and mirrors the NACA 0015 airfoil profile. The plenum was used to test flow uniformity at the slot, which is an important part of the efficacy of the design. The slot had a height of 1 mm. The plenum design shown herein was also used to validate and test the efficiency of the air supply unit in experiments. Plena of varying spans, heights, and inner configurations may be used with the NACA 0015 airfoil, or other airfoils, without departing from the scope of the present disclosure.

Figure 7A:
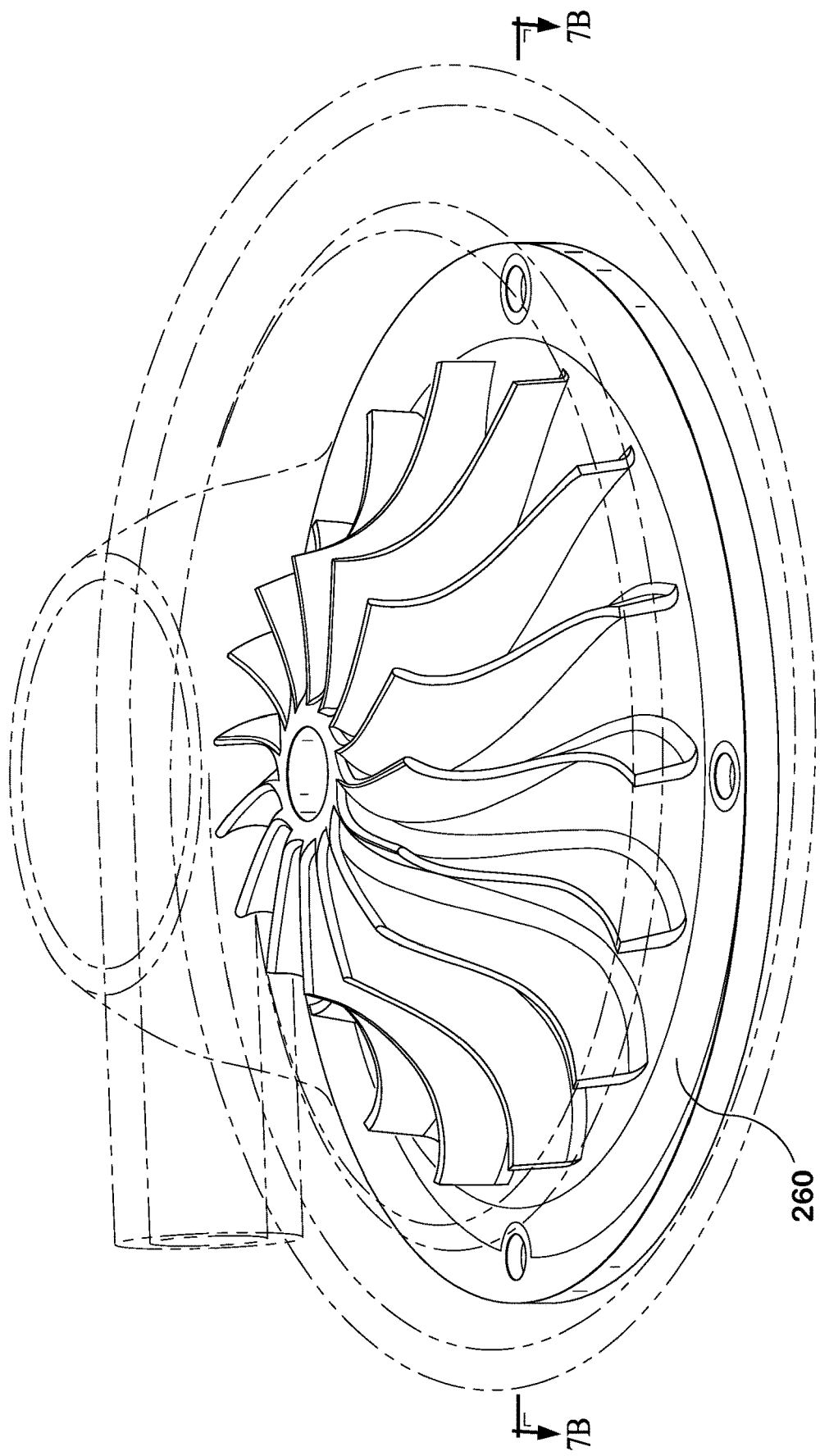
FIG. 7A shows a transparent section of an air supply unit (ASU) portion of the circulation control system of the present disclosure.
Figure 7B:
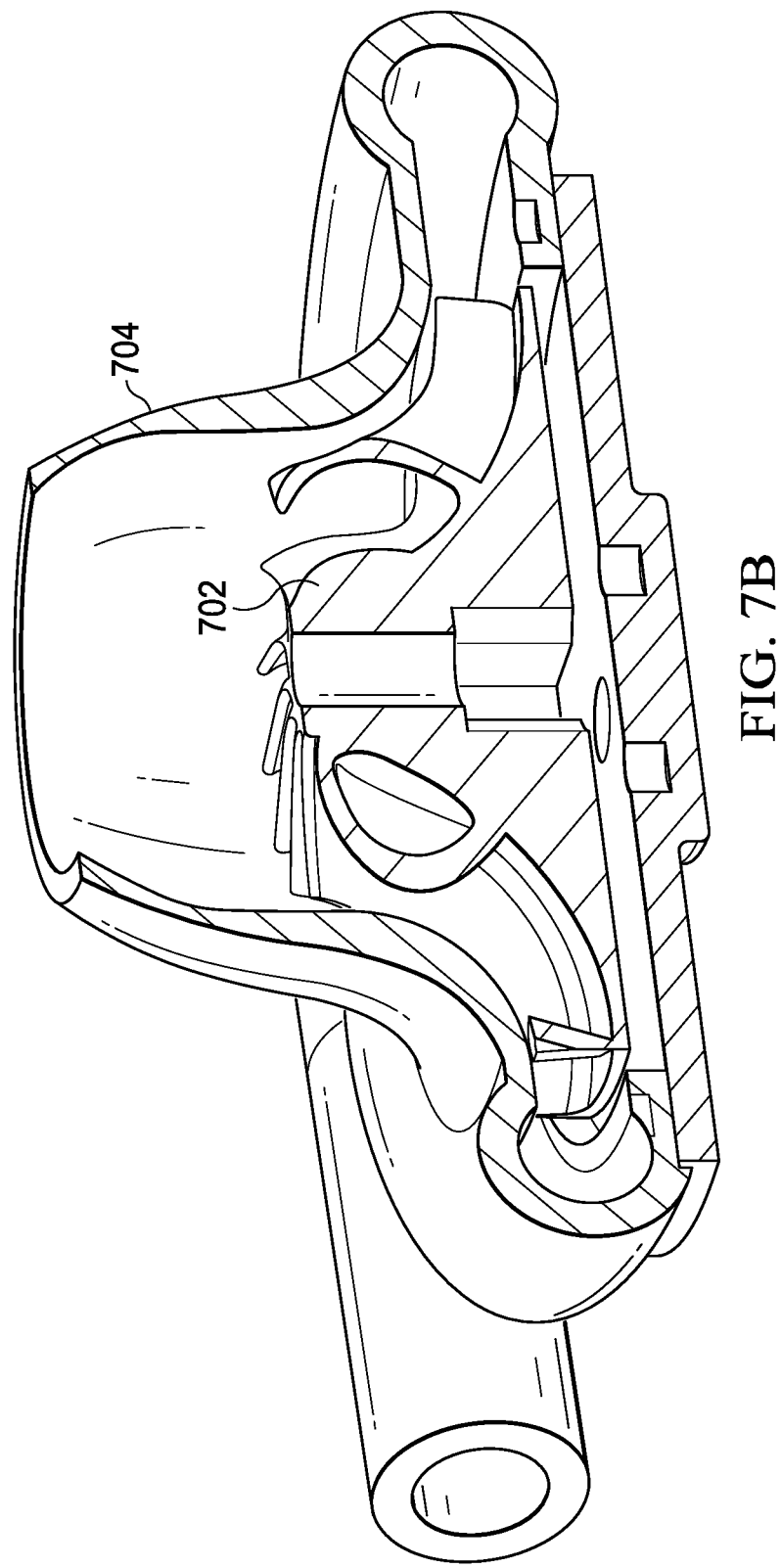
FIG. 7B shows a cutaway section of an air supply unit (ASU) portion of FIG. 7A

FIG. 7A shows a transparent view of an ASU 700, and FIG. 7B shows an internal cutaway view of a centrifugal compressor 702 that may be used in the circulation control system of the present disclosure. The function of the centrifugal compressor 702 is to control the mass flow of air through the circulation control system. The centrifugal compressor's housing 704 and its tolerance with the impeller are important parameters which affect the performance of the air supply unit. The housing 704, in some embodiments, may be built with large clearances between the housing and the compressor due to variations in designs of ASUs, but in many embodiments while in other versions are built with a tolerance of 1 mm with respect to the impeller (i.e., the rotating portion of the compressor 702) to minimize clearance losses. The centrifugal compressor is somewhat conical in shape, and the housing 704 is constructed in this embodiment to mirror the profile of the compressor 702 and impeller. As shown, the housing 704 has an involute profile and the height of the walls is kept within the tolerance limits (e.g., 1 mm) of the impeller's blade height at the outlet. A spline curve used to design the inlet for the compressor is derived from the blade curve of the impeller. These features ensure there is minimal space for air to circulate without going where it is intended, which is through the ADS and out the plena. Minimizing turbulence and losses at the ASU is also important to ensuring that air blown out the trailing edge is sufficiently strong, uniform, and consistent. The ASU 700 of the present design is configured as shown because it provides sufficient mass air flow at low power requirements, which are difficult to balance in a small UAV. The design of the ASU 700 also provides an efficient, minimal, lightweight shape to minimize drag and weight of the system.

Figure 8:
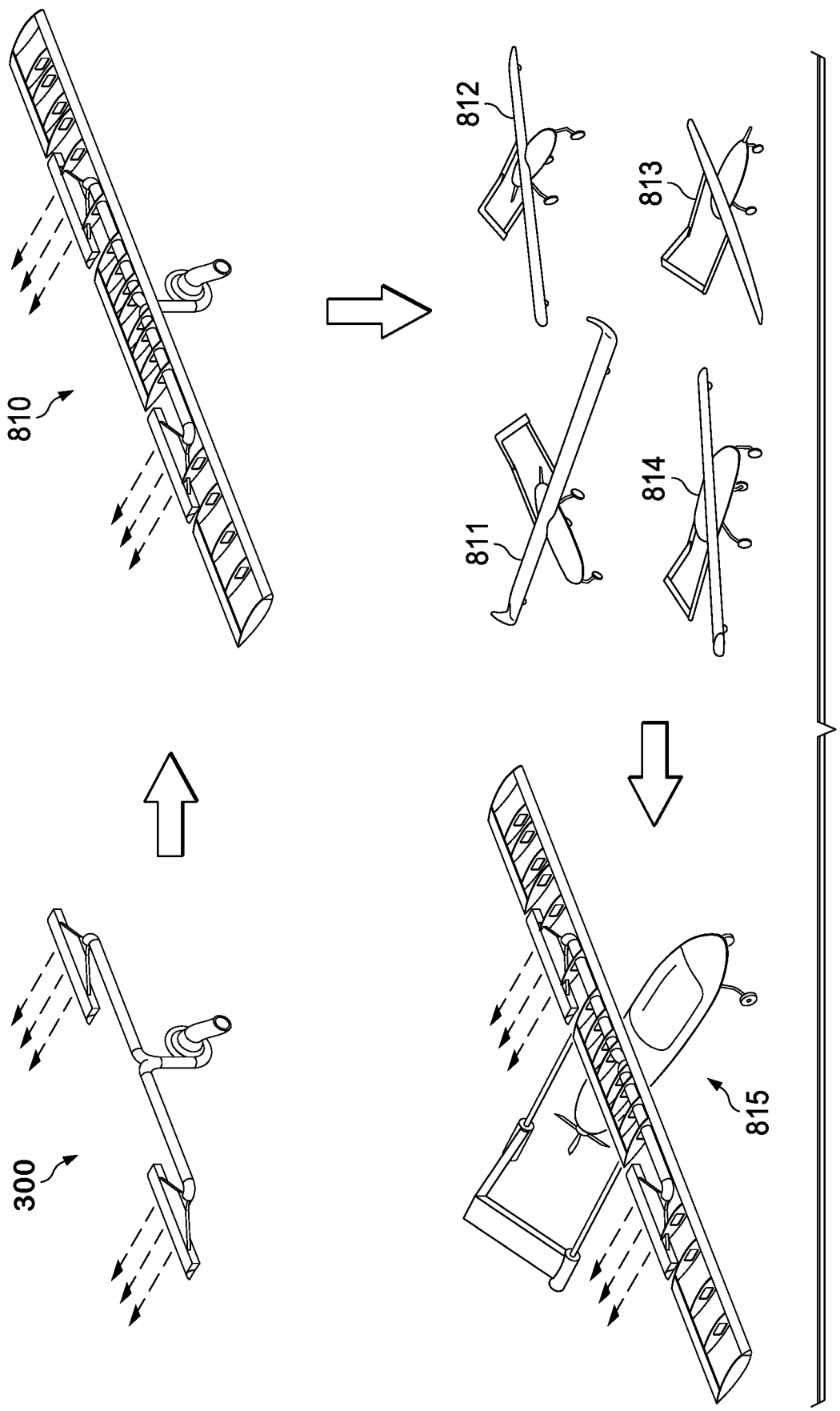
FIG. 8 shows a circulation control system, circulation control wing, exemplary conventional UAVs, and how either the system or the wing may be implemented in a UAV.

FIG. 8 shows how the CC system 300 or the CC wing 810 of the present disclosure may be implemented in existing UAVs. It is contemplated that in some embodiments, a CC system 300 may be manufactured as a standalone system, and may be attached as an after-market piece of equipment (e.g., retrofitted) on an existing UAV airfoil. It is also contemplated that an entire CC wing 810 may be manufactured, wherein the CC system 800 is built into a particular kind of airfoil. Then, the CC wing 810 may be used to replace an entire airfoil of an existing UAV, such as the exemplary UAVs 811-814. Through either embodiment, a CC-enabled 815 UAV of the present disclosure may be constructed as depicted.

Experiments conducted to compare the effects of circulation control on a UAV used a custom-built UAV with circulation control with specifications similar to conventional UAVs without circulation control, and then ran tests with the circulation control turned off to provide baseline flight data. The custom-built UAV was equipped with a NACA 0015 airfoil integrated with the twin-boom inverted V-tail. In the experiments, relevant flight data using the UAV with the CC system off was compared to flight data collected with the CC system on. The CC wing was built using the profile of a symmetric NACA0015, with a span of 2 meters and a chord length of c=240 mm, yielding an aspect ratio of AR=8.3. The geometric parameters of the wing are shown in Table 2 below.

Figure 9:
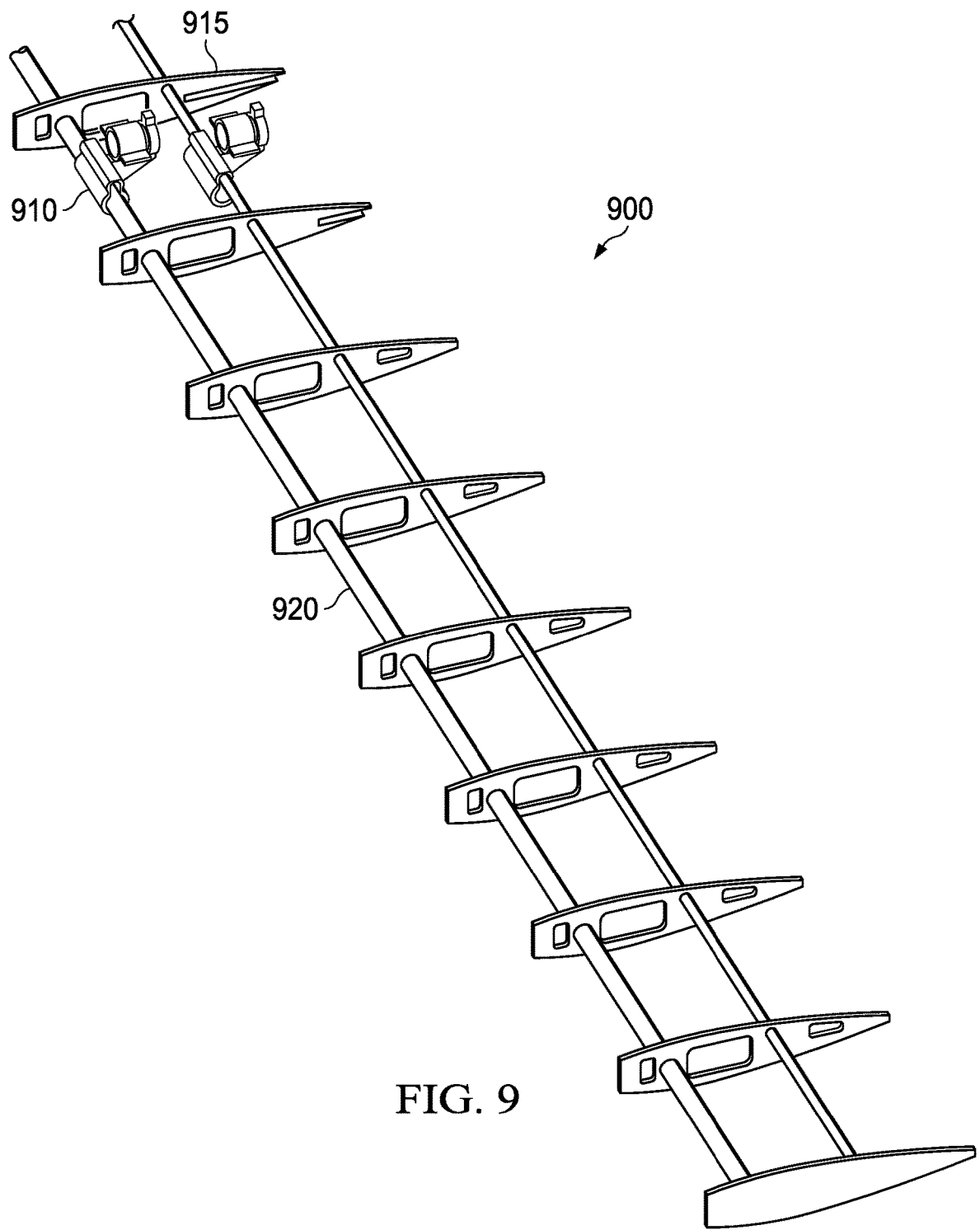
FIG. 9 shows an assembly of ribs and support rods of a wing of the present disclosure.

The internal structure of the wing is shown in FIG. 9 and comprises: the ribs 915 (10 each side), which in this embodiment 900 are rapid prototyped out of acrylonitrile-butadiene-styrene (ABS) plastic and two carbon fiber rods 920. The wing also comprises supports for the tail boom 910. CC wings according to the present disclosure may be built with similar or different materials that are sufficiently durable, strong, and lightweight for various embodiments.

Figure 10:
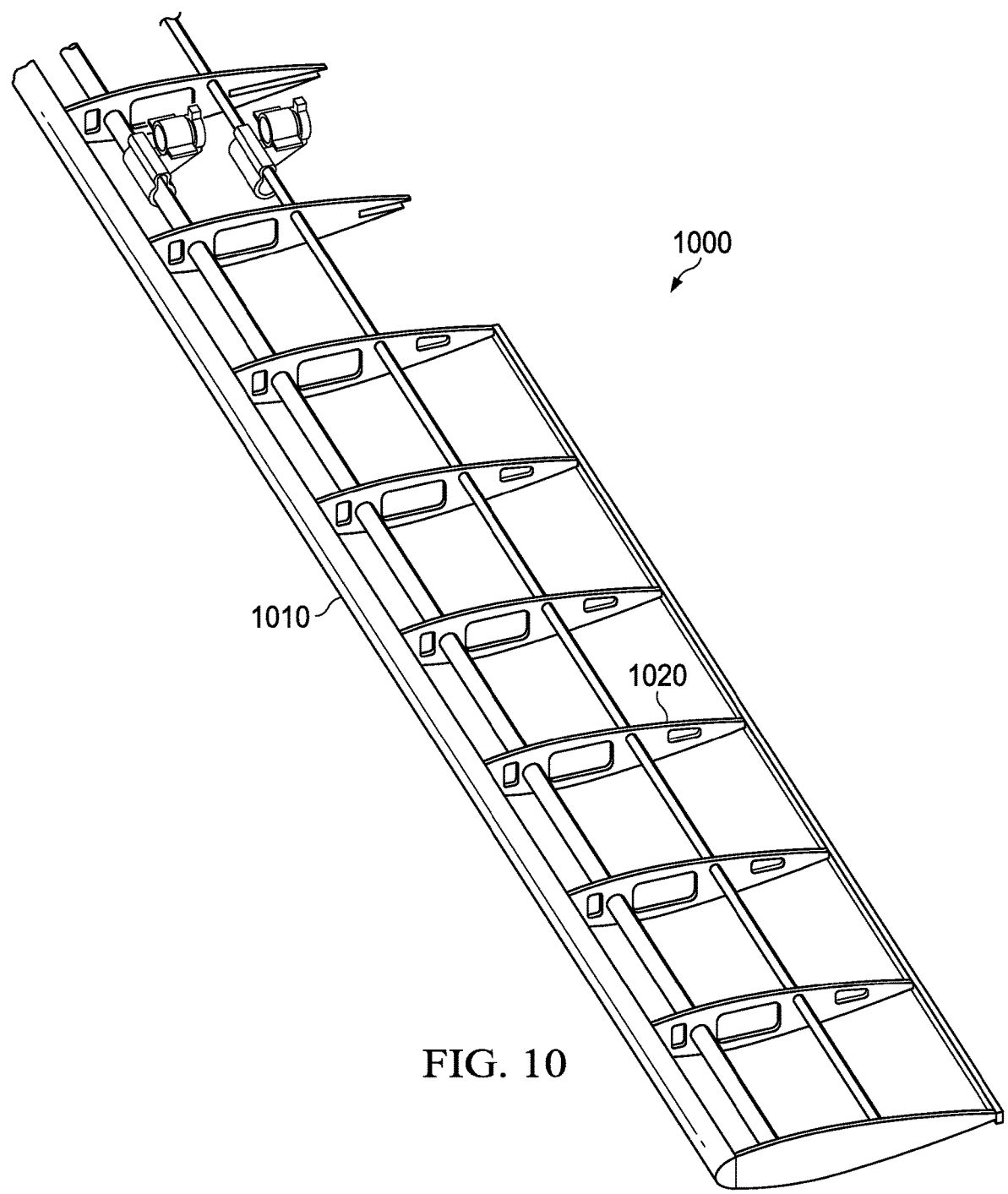
FIG. 10 shows an assembly of ribs, support rods, and front edge and trailing edge portions of a wing to illustrate how a circulation control wing of the present disclosure may be constructed.
Figure 11:
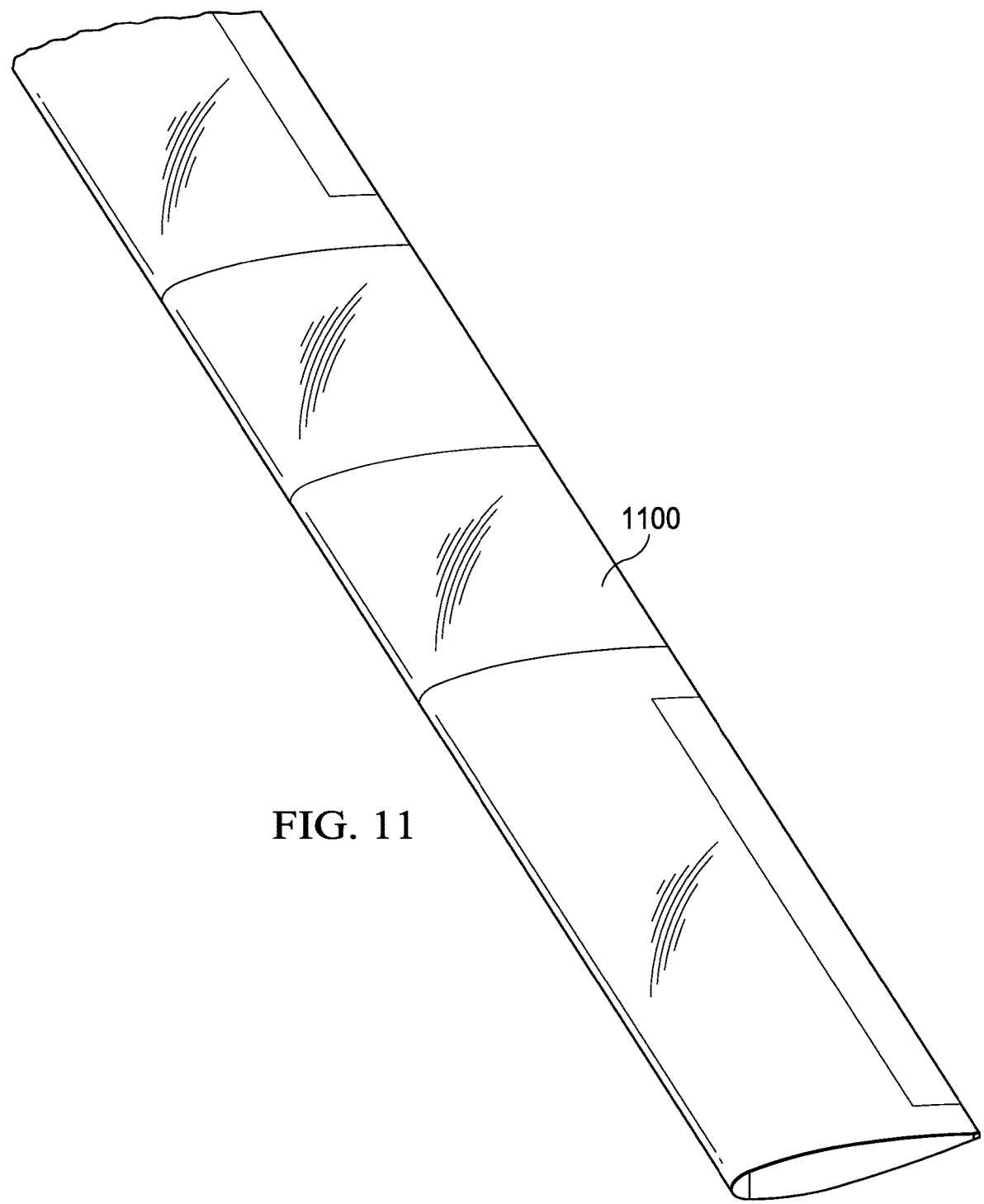
FIG. 11 shows a smooth outer surface of a wing constructed according to the present disclosure.
Figure 12:
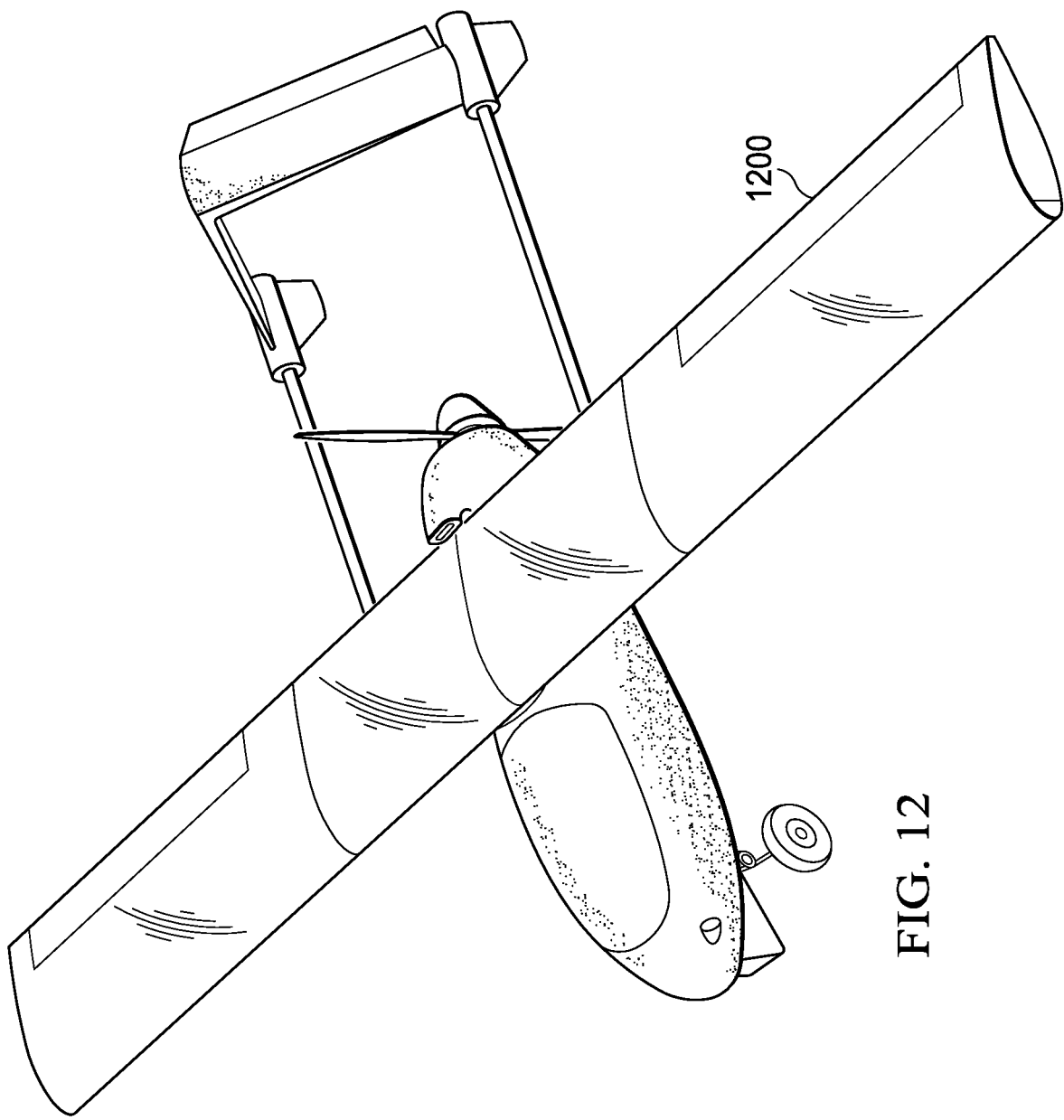
FIG. 12 shows a fully assembled Unmanned Circulation Control Aerial Vehicle of the present disclosure.

FIG. 10 shows another view of the construction of the wing; the leading- and trailing-edge of the wing in this embodiment 1000 are constructed of balsa wood and MonoKote® tape. These materials were suitable for the construction of the test UAV and may be suitable for other embodiments. The balsa wood was suitable because it was rigid, lightweight, and easily formed, and the MonoKote® tape was suitable because it has a smooth exterior, but these are just examples of materials that may be used in construction of a CC wing of the present disclosure, and many other types of materials may be used. The MonoKote® sheet 1010 was applied using heat, which causes the covering to shrink and activates an adhesive backing that is attached securely to the wing model and gives a smooth surface finish 1100, as shown in FIG. 11. The plastic ribs 1020 and the carbon fiber rods were used to add strength to the structure of the wing without adding excessive weight. Note that part of the circulation control system is integrated with the fuselage and other parts (tubing and plenum design) are inside the circulation control wing. FIG. 12 shows the assembled CC wing 1200 on the test UAV. Table 4 below shows exemplary geometric patterns of the test wing in experiments.

TABLE 4

Geometric parameters of the test wing in experiments

| Wing | | | |
|---|---|---|---|
| Airfoil | | NACA0015 | |
| Chord | c | 0.24 | m |
| Thickness | t/c | 15 | % |
| Camber | m/e | 0 | % |
| Angle of incidence | $\epsilon$ | 2 | ° |
| Area | S | 0.48 | m$^2$ |
| Wingspan | b | 2 | m |
| Half-Span | s | 1 | m |
| Aspect Ratio | A | 8.33 | |
| Dihedral angle | $\beta$ | 0 | ° |
| Sweep angle | $\Lambda$ | 0 | ° |
| Alleron | | | |
| Span | $b_{all}$ | 0.50 | m |
| Chord | $c_{all}$ | 0.03 | m |
| Maximum Deflection | $\xi_{max}$ | $-15 < \xi < 10$ | |

Instrumentation plays a critical role in validating the performance of a UAV, whether for the purpose of experiments or for other data collection purposes. However, UAVs often have limited weight and space availability. Therefore, using the right instrumentation is critical. In experiments testing the performance of a baseline UAV flight with CC off against an exemplary UAV flight with CC of the present disclosure on, the key role of the instrumentation system in these cases was to track, characterize and validate the performance of the UAV. A typical test flight used the following data channels: one data channel for time stamp (micro-controller); five data channels for the pilot's inputs (RC receiver); three data channels for Pitot sensors (raw data); three data channels (Yaw, Pitch, Roll) for inertial Measurement Unit (IMU) orientation; one data channel for Temperature; one data channel for Altitude (High range Barometric sensor); one data channel for low range high accuracy altitude (Ultrasonic distance sensor). All data was stored in on-board memory card (e.g., a 32 GB memory card). The data contains a record of the entire flight; however, maneuver markers (set by the pilot with a switch on a spare RC channel) were available to indicate the areas of interest and allow for a quick review of data in the field.

Figure 13:
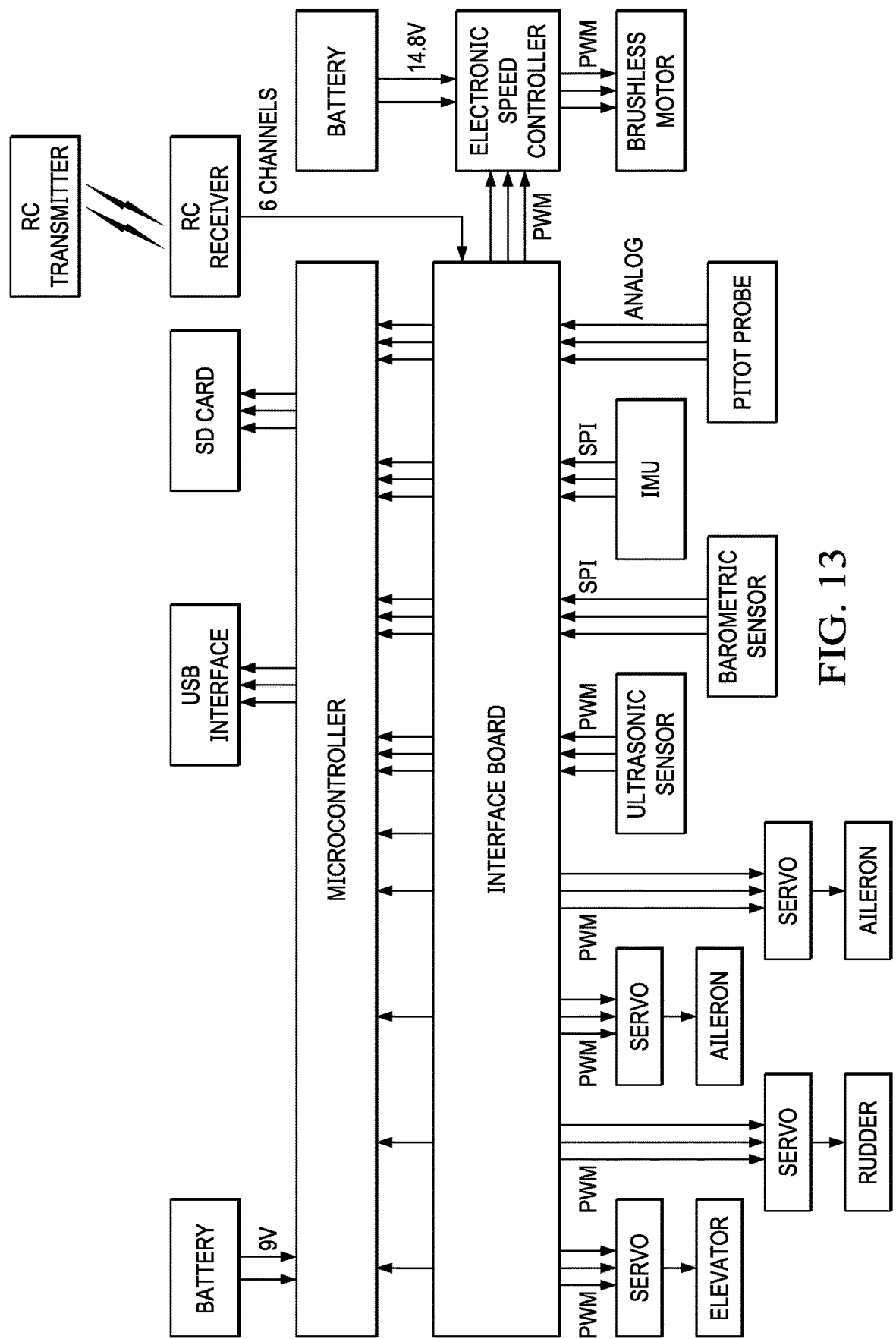
FIG. 13 is a logical block diagram of measurement and operational electronics for a UAV of the present disclosure.

A block diagram of an exemplary instrumentation system is seen in FIG. 13. FIG. 13 is a logical block diagram of operational hardware that exists on a UAV to power and control it for flight, as well as measurement hardware used to collect data during experiments described herein. The following particular instruments may be used to implement aspects of the present disclosure, but others may also be used. In experiments for testing the UCCAV of the present disclosure, the measurement of the attitude angles, $\varphi$, $\theta$, and $\Psi$ (roll, pitch and yaw respectively), was performed with a VectorNav VN-100 IMU chip mounted on a development board. This sensor incorporates a 3-axis magnetometer, a 3-axis accelerometer, and 3-axis gyroscope with extended Kalman filter. The IMU's outputs include the aircraft attitude expressed as Euler angles or quaternions, linear accelerations, angular rates or magnetic local field. Three pitot probes, each connected to a differential pressure sensor, were located at the front of the fuselage and on either side of the wings to measure true airspeed. To record the altitude and temperature, a barometric pressure sensor (Bosch BMP085 transducer mounted on a Sparkfun breakout board) was used. An ultrasonic distance sensor located on the lower front part of the fuselage was used to locate the exact moment that the front wheel becomes airborne. Table 5 lists the sensors used on-board the UCCAV and their specifications.

TABLE 5

Instrumentation/Sensor Specifications for UCCAV

| Component | Manufacturer | Part Number | Specifications |
|---|---|---|---|
| Microprocessor | Arduino | Arduino Mega 2560 | Microcontroller: Atmega2560<br>Operating Voltage: 5 V<br>Digital I/O Pins: 54 with 15 PWM pins<br>Analog Inputs: 16<br>Weight: 37 g |
| RC Transmitter/Receiver | Flysky | FS-i6 | Frequency range: 2.405 to 2.475 GHz<br>Numebr of Channels: 6 |
| Inertial Measurement Unit | Vectornav | VN-100 | 3-axis accel/gyro/mags. with on-board extended Kalman Filter<br>Gyro range: ±2000°/s, linearity <0.1% FS<br>Accelerometer range: ±16 g, linearity <0.5% FS<br>Overall weight: 37 g |
| Pitot Sensors | Freescale Semiconductor | MPXV7002DP | Pressure range: ±2 kPa<br>Accuracy: 2% FS<br>Sensitivity: 1 V/kPa<br>Response time: 1 ms |
| Barometric Sensor | Bosch Sensortec | BMP085 | Pressure range: 30 to 110 kPa<br>RMS noise: 0.1 m<br>Weight: 10 g |
| Ultrasonic Distance Sensor | | HC-SR04 | Ultrasonic Frequency: 40 kHz<br>Resolution: 1 cm |
| Memory Module | Sparkfun OpenLog | Dev-09530 | Baud rates: 2400 to 115200 |

The instrumentation and sensors specified in Table 5 are exemplary only, and other instrumentation may be used to collect data onboard a UCCAV of the present disclosure. It is contemplated that in many embodiments, only the existing UAV operational hardware (i.e., for flight and control) will be implemented, and the measurement instrumentation may not be required to implement a CC system or CC wing at all.

To obtain minimum takeoff distance at the specific liftoff speed, the aerodynamic forces which act on the aircraft must provide the maximum acceleration during the takeoff roll. Takeoff is affected by many factors, which cannot all be accurately measured nor properly compensated for, as discussed in G. L. Gallagher, L. B. Higgins, L. A. Khinoo, and P. W. Pierce, Fixed Wing Performance, Veda Incorporated Contract N00421-90-C-0022, 1992, which is incorporated by reference herein in its entirety. To estimate the overall performance and capabilities of the aircraft itself, it is possible, within broad limits, to rely on an average of numerous takeoffs in order to minimize residual errors. The evaluation of takeoff performance in experiments testing the system of the present disclosure were in two phases, as shown in FIGS. 14A and 14B. FIG. 14A shows an anticipated trajectory of a ground phase 1401A and, an air phase 1402A, of an experimental control flight of a UAV without circulation control. The ground phase 1401A begins when the aircraft initiates and terminates when the aircraft becomes airborne; the air phase 1402A, which is the portion of flight from leaving the ground until the aircraft reaches an altitude of 50 ft. (15 m). FIG. 14B shows the anticipated takeoff phases and the performance behavior that may be achieved by the UCCAV design. As shown, the ground phase 1401B is anticipated to be shorter than the ground phase in 1401A, and the air phase 1402B is also anticipated to be shorter, with the UCCAV reaching 50 ft. in height more quickly.

Gross weight, air density, wind conditions (headwind/tailwind), and coefficient of friction are some of the parameters that can significantly affect the takeoff distance, and proper consideration must be given to them. Further, individual pilot technique can cause a greater variation in takeoff data than all other parameters combined. Factors that significantly affect takeoff performance among others are: aileron and elevator position during acceleration; pitch rate during rotation and angle of attack at lift off. To eliminate the variation due to pilot's individual technique and obtain repeatable data, a specific takeoff technique, where the pilot applies full throttle and the aircraft takes off once the required velocity is achieved, was followed during the testing.

During the test experiments of the UCCAV against the conventional UAV, pitch was not introduced during takeoff and angle of attack at lift off can be assumed repeatable under the same conditions (maximum takeoff weight, weather conditions, etc.). To record takeoff distance (ground phase and air phase) and takeoff velocity accurately, three cameras were positioned on the test runway. Runway markers were placed, which could be observed from both the cameras and the observers to track the position of the plane during takeoff. An ultrasonic distance sensor was placed on the belly of the fuselage (close to the front wheel) and tracked the distance from the ground during takeoff.

Figure 16A:
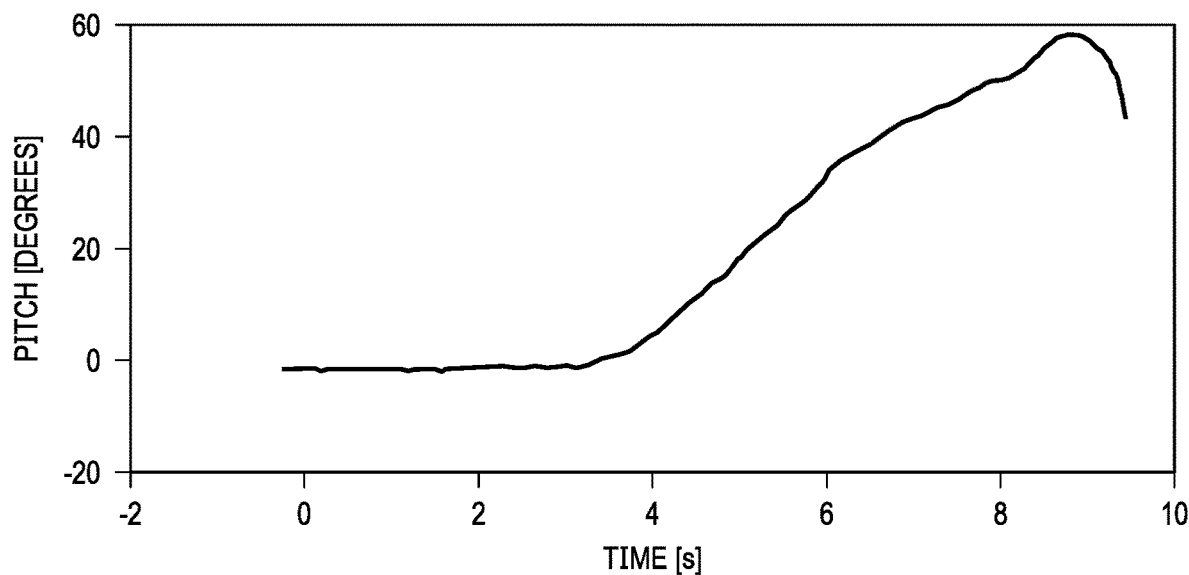
FIG. 16A shows the pitch angle of an experimental flight implementing circulation control.
Figure 16B:
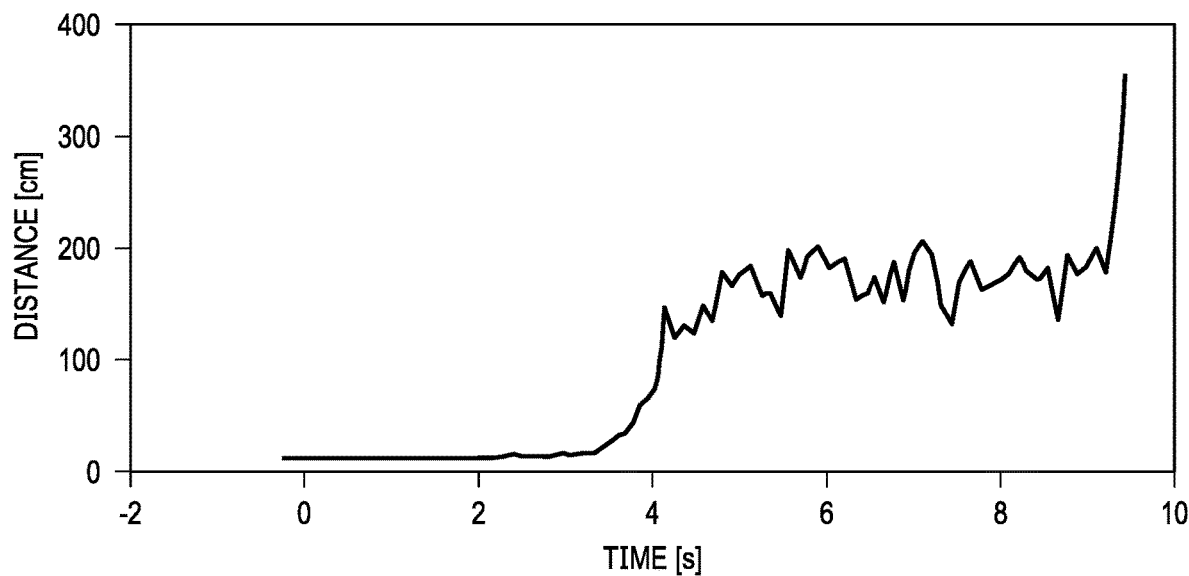
FIG. 16B shows a distance traveled in an experimental flight implementing circulation control.

Referring briefly to FIGS. 16A and 16B, shown are the pitch angle (FIG. 16A) and distance (FIG. 16B) recorded of the test flight of the UCCAV as measured by the onboard instrumentation. The sensor reads the distance from the runway and can track the exact point that the front wheel becomes airborne. Weather conditions (runway temperature, humidity, wind condition) were recorded using anemometers and sensors that are located on the side of the runway. The barometric sensor recorded temperature humidity pressure and altitude. The takeoff velocity was recorded from three pitot probes, which were located on the wings (two) and on the nose-tip of the aircraft.

Tests of the UCCAV compared to the conventional UAV showed significant a significant reduction in the required takeoff distance and increase in the angle of attack for the UCCAV. FIG. 15A shows that without circulation control, the takeoff ground distance 1501A in experiments was 384 ft. FIG. 15B shows that with circulation control, under the same test conditions, the takeoff ground distance 1510B was 177 ft., just under half of the distance required for the flight without circulation control. The images in FIGS. 14A and 14B show anticipated results from comparing a conventional UAV and a UCCAV, and the images in FIGS. 15A and 15B show actual improvements in takeoff distance during testing.

The circulation control system of the present disclosure may provide advantages in reduced takeoff distance and increased payload due to its increased takeoff efficiency as well as increased cruise flight efficiency. It is contemplated that embodiments of the circulation control system of the present disclosure may be modified in their dimensions and materials to accommodate the shapes and other design considerations of other types of fixed wing UAV.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and novel features disclosed herein.

What is claimed is:

1. A circulation control system for a small or miniature unmanned aerial vehicle (UAV), the system comprising:
    an air supply unit attached to the UAV configured to generate a specified amount of mass air flow;
    an air delivery system comprising at least two tubes attached to the air supply unit;
    wherein the air supply unit is configured to intake external air directly from an exterior of the UAV on a front side of the air supply unit, compress the external air, and push compressed air through a back side of the air supply unit into the air delivery system;
    a circulation control wing through which the compressed air from the air supply unit is delivered through the air delivery system, the circulation control wing comprising at least two plena configured to allow the compressed air to blow the air out of one or more slots in a trailing edge of the wing,
    wherein the compressed air turns through two right angles through each of the two tubes of the air delivery system between the air supply system and the one or more slots; and
    at least one dual radius flap positioned behind the one or more slots.

2. The circulation control system of claim 1, wherein the air delivery system delivers an equal amount of air to each plenum.

3. The circulation control system of claim 1, wherein the circulation control wing comprises two dual radius flaps, one dual radius flap associated with each of the two plena.

4. The circulation control system of claim 1, wherein the air supply unit comprises a centrifugal compressor and a housing.

5. The circulation control system of claim 1, wherein the at least two plena are configured to distribute air equally across an entire width of the at least one dual radius flap.

6. The circulation control system of claim 1, wherein the small or miniature UAV weighing under 20 kg.

7. The circulation control system of claim 1, wherein the small or miniature UAV is a fixed-wing UAV, and the air supply unit is mounted in a fuselage area of the fixed-wing UAV.

8. A small or miniature unmanned aerial vehicle (UAV) comprising a fixed wing and a circulation control system, the circulation control system comprising:
    an air supply unit attached to the UAV configured to generate a specified amount of mass air flow;
    an air delivery system, comprising at least two tubes attached to the air supply unit;
    wherein the air supply unit is configured to intake external air directly from an exterior of the UAV on a front side of the air supply unit, compress the external air, and push compressed air through a back side of the air supply unit into the air delivery system;
    at least two plena mounted within the fixed wing and configured to receive the compressed air from the air delivery system and blow the compressed air out of one or more slots in a trailing edge of the wing, and at least one dual radius flap positioned behind the one or more slots.

9. The UAV of claim 8, wherein the air delivery system delivers an equal amount of air to each plenum.

10. The UAV of claim 9, wherein the circulation control system comprises two dual radius flaps, one dual radius flap associated with each of the two plena.

11. The UAV of claim 8, wherein the air supply unit comprises a centrifugal compressor and a housing.

12. The UAV of claim 8, wherein the at least two plena are configured to distribute air equally across an entire width of the at least one dual radius flap.

13. The UAV of claim 8, wherein weighs under 20 kg.

14. The UAV of claim 8, the air supply unit is mounted in a fuselage area of the UAV.

15. A circulation control system for a small or miniature unmanned aerial vehicle (UAV), the system comprising:
    an air supply unit defining a circulation control efficiency by providing a mass flow sufficient to increase lift for an airfoil of the UAV during takeoff and flight;
    a circulation control wing comprising:
        an air delivery system comprising at least two tubes attached to the air supply unit, configured to deliver the mass flow to a trailing edge of the airfoil;
        wherein the air supply unit is configured to intake external air directly from an exterior of the UAV on a front side of the air supply unit, compress the external air, and push compressed air through a back side of the air supply unit into the air delivery system;
        a plenum; and
        a dual radius flap.

16. The circulation control system of claim 15, wherein the circulation control wing comprises two plena, and the air delivery system delivers an equal amount of air to each plenum.

17. The circulation control system of claim 16, wherein the circulation control wing comprises two dual radius flaps, one dual radius flap associated with each of the two plena.

18. The circulation control system of claim 15, wherein the air supply unit comprises a centrifugal compressor and a housing.

19. The circulation control system of claim 15, wherein the aerial vehicle is a small or miniature unmanned aerial vehicle (UAV) weighs under 20 kg.

20. The circulation control system of claim 15, wherein the UAV is a fixed-wing unmanned aerial vehicle (UAV), and the air supply unit is mounted in a fuselage area of the fixed-wing UAV.

* * * * *